United States Patent
Fairgrieve et al.

(10) Patent No.: US 9,630,623 B2
(45) Date of Patent: Apr. 25, 2017

(54) VEHICLE SPEED CONTROL SYSTEM AND METHOD WITH EXTERNAL FORCE COMPENSATION

(71) Applicant: Jaguar Land Rover Limited, Whitley Coventry Warwickshire (GB)

(72) Inventors: Andrew Fairgrieve, Rugby (GB); Daniel Woolliscroft, Birmingham (GB); James Kelly, Solihull (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/421,876

(22) PCT Filed: Aug. 15, 2013

(86) PCT No.: PCT/EP2013/067095
§ 371 (c)(1),
(2) Date: Feb. 16, 2015

(87) PCT Pub. No.: WO2014/027071
PCT Pub. Date: Feb. 20, 2014

(65) Prior Publication Data
US 2015/0232092 A1    Aug. 20, 2015

(30) Foreign Application Priority Data
Aug. 16, 2012 (GB) .................................. 1214651.0

(51) Int. Cl.
*B60W 30/14* (2006.01)
(52) U.S. Cl.
CPC ....... *B60W 30/143* (2013.01); *B60W 2720/30* (2013.01)

(58) Field of Classification Search
None
See application file for complete search history.

(56) References Cited

U.S. PATENT DOCUMENTS

| 6,266,604 B1 | 7/2001 | Linden |
| 8,818,677 B2 | 8/2014 | Inoue et al. |

(Continued)

FOREIGN PATENT DOCUMENTS

| CN | 101678768 A | 3/2010 |
| EP | 1010567 A2 | 6/2000 |

(Continued)

OTHER PUBLICATIONS

International Search Report for application No. PCT/EP2013/067095, dated Nov. 18, 2013, 3 pages.

(Continued)

*Primary Examiner* — Todd Melton
*Assistant Examiner* — Jason Roberson
(74) *Attorney, Agent, or Firm* — Reising Ethington P.C.

(57) ABSTRACT

A method for operating a speed control system of a vehicle is provided. The method comprises detecting an external force acting on the vehicle wherein the external force has an accelerating or decelerating effect on the vehicle. The method further comprises automatically adjusting a rate of change of at least one component of a net torque being applied to one or more wheels of the vehicle to compensate for the accelerating or decelerating effect of the external force on the vehicle. A system for controlling the speed of a vehicle comprising an electronic control unit configured to perform the above-described methodology is also provided.

17 Claims, 6 Drawing Sheets

(56) References Cited

U.S. PATENT DOCUMENTS

| | | | |
|---|---|---|---|
| 2003/0074124 A1 | 4/2003 | Ono et al. | |
| 2009/0024354 A1* | 1/2009 | Osaki | B60W 30/143 |
| | | | 702/154 |
| 2011/0282558 A1* | 11/2011 | Park | B60W 30/143 |
| | | | 701/94 |
| 2011/0307154 A1* | 12/2011 | Takeda | B60T 7/122 |
| | | | 701/70 |

FOREIGN PATENT DOCUMENTS

| | | |
|---|---|---|
| EP | 1060938 A2 | 12/2000 |
| JP | 09207613 A | 8/1997 |
| JP | H1120496 A | 1/1999 |
| JP | H11227492 A | 8/1999 |
| JP | 2003320872 A | 11/2003 |
| JP | 2004322764 A | 11/2004 |
| JP | 2007145201 A | 6/2007 |
| JP | 2007176321 A | 7/2007 |
| WO | 2010144028 A1 | 12/2010 |

OTHER PUBLICATIONS

UK Combined Search and Examination Report for corresponding application No. 1314638.6, dated Mar. 26, 2014, 7 pages.

Written Opinion for application No. PCT/EP2013/067095, dated Nov. 18, 2013, 4 pages.

Japanese Office Action, in Japanese with English summary, corresponding to Jp application No. 2015-526993, dated Apr. 5, 2016, 7 pages.

Chinese Office Action, in Chinese with partial English translation, corresponding to CN application No. 201380043998.7, dated Apr. 29, 2016, 19 pages.

* cited by examiner

VEHICLE SPEED CONTROL SYSTEM AND METHOD WITH EXTERNAL FORCE COMPENSATION

TECHNICAL FIELD

The present invention relates generally to vehicle speed control and more particularly, to a method and system for controlling the speed of a vehicle capable of traversing a variety of different terrains, and doing so to compensate for external accelerating forces on the vehicle that may affect vehicle acceleration (e.g., that cause acceleration or deceleration of the vehicle).

BACKGROUND

In known vehicle speed control systems, typically referred to as cruise control systems, a set-speed for the vehicle may be initially set by manually bringing the vehicle up to the desired speed, and then manipulating a user-selectable user interface device, such as, for example, by manipulating (e.g., pressing) a pushbutton to set that speed as the set-speed. When the user wants to change the set-speed thereafter, the same or different user input device(s) may be manipulated to increase or decrease the set-speed. In response to a requested or commanded change in set speed, the speed control system causes the vehicle to accelerate or decelerate, as appropriate, to reach or match the new set-speed by sending commands to one or more vehicle subsystems, such as, for example, the powertrain and/or brake subsystems of the vehicle.

One drawback of such known speed control systems, however, is that when the vehicle speed falls below the target set-speed or a change in set-speed to a target set-speed is commanded and the vehicle is accelerated or decelerated to reach the target set-speed, forces external to the vehicle that may affect vehicle acceleration may not be sufficiently compensated for. As a result, the vehicle may be accelerated or decelerated in a manner that may cause the overshooting or undershooting of the target set-speed, as well as causing the vehicle acceleration or deceleration to be inconsistent with one or more of the user's expectation (e.g., it may accelerate/decelerated faster or slower than the user anticipates or expects), a prescribed acceleration profile, and predetermined acceleration corridor. These forces may include, for example, gravitational forces acting on the vehicle as the vehicle ascends or descends a gradient, rolling resistance resulting from a high drag surface the vehicle is traversing, drag associated with driving through a body of water (i.e., during a wading event), and the like. If the magnitude of one or mere forces acting on the vehicle is sufficiently high, the acceleration or deceleration of the vehicle, as the case may be, may be adversely affected in mat the force may undesirable increase or decrease the acceleration or deceleration of the vehicle beyond that which would be expected.

Accordingly, there is a need for a speed control system and method for use with the same that minimizes and/or eliminates one or more of the above-identified deficiencies.

SUMMARY

According to an aspect of the invention for which protection is sought, there is provided a method for controlling the speed of a vehicle. The method comprises: detecting an external force acting on the vehicle wherein the external force has an accelerating or decelerating effect on the vehicle; and automatically adjusting a rate of change of at least one component of a net torque being applied to one or more wheels of the vehicle to compensate for the accelerating or decelerating effect of the external force on the vehicle.

According to another aspect of the invention for which protection is sought, there is a provided a speed control system for a vehicle. The system comprises an electronic control unit that is configured to: detect an external force acting on the vehicle wherein the external force has an accelerating or decelerating effect on the vehicle; and automatically adjust a rate of change of at least one component of a net torque being applied to one or more wheels of the vehicle to compensate for the accelerating or decelerating effect of the external force on the vehicle.

According to yet another aspect of the invention for which protection is sought, there is provided a vehicle comprising the system as described herein.

According to a further aspect of the invention for which protection is sought, there is provided a carrier medium carrying a computer-readable code for controlling a vehicle to carry out the method as described herein.

Optional features of the various aspects of the invention are set out below in the dependent claims.

According to one or more examples of one or more of the aspects of the invention set forth above, there is provided a speed control system operable in an off-highway condition in which the system controls means for applying torque to at least one of a plurality of wheels of a vehicle in order to maintain a prescribed set-speed over ground. The system may be operable to allow a user to increase or decrease the set-speed from a current set-speed to a new, target set-speed. Thus when the user commands a change in set-speed, the speed control system may control the means for applying torque in such a manner as to allow the vehicle automatically to accelerate (in a positive or negative sense) to achieve the new set-speed.

The means for applying torque may comprise a powertrain and optionally a braking system, as will be described in more detail below.

In changing the speed of the vehicle to match the new set-speed, the system may be operable to detect and take into account an external force acting on the vehicle in such a manner as to accelerate the vehicle (in a positive or negative sense). The speed control system may compensate for the presence of the external force when changing the amount of torque commanded to be applied to the one or more wheels so as to reduce a risk of overshoot of the new target set-speed. In some embodiments, the system may be operable substantially to prevent overshoot or undershoot of the new target set-speed. The speed control system may be operable to control a powertrain and optionally a braking system. It is to be understood that in some embodiments a powertrain may comprise means for applying relatively rapidly a negative torque to one or more wheels, for example by means of one or more electric machines, for example one or more electric machines operable as electrical generators, without a requirement for a friction braking system to be deployed.

It is to be understood that an external force acting on a vehicle to accelerate the vehicle may be a retarding force acting to cause negative acceleration of the vehicle (i.e. decelerate the vehicle) or a force acting in such a manner as to cause positive acceleration of the vehicle.

It is to be understood that a force acting to accelerate a vehicle in a positive or negative manner may be a force having a component acting in a direction parallel to or along a direction of travel of the vehicle. In the case of a vehicle travelling uphill, the force may act in a direction opposite the direction of travel and therefore be a retarding or decelerating force. In some embodiments the normal direction of travel (i.e. when the vehicle is experiencing substantially zero side slip or yaw) may be arranged to be parallel to or along a longitudinal axis of the vehicle.

The speed control system may be operable to increase or decrease the amount of torque commanded to be applied to one or more wheels so that the amount of torque increases or decreases at a rate that is dependent on the size of the external force. Thus in some embodiments, the greater the external force (such as a retarding or decelerating force or a force causing positive acceleration) the slower the rate at which the amount of torque applied to one or more wheels by the means for application of said torque is commanded to change.

A positive accelerating force may for example be experienced in the case the vehicle is descending a slope, and a negative force if the vehicle is ascending a slope.

In some embodiments the system is provided with data in respect of at least one selected from amongst a gradient of a driving surface (for example toy reference to an attitude of the vehicle), gear selection, tyre friction, wheel articulation, rolling resistance and a selected terrain response (TR) mode of the vehicle in addition to wheel speed.

In some embodiments in which driving surface gradient information is provided, the system may be operable to control a rate at which the amount of torque applied to one or more wheels changes in dependence on the magnitude and direction of the force acting to accelerate or decelerate the vehicle.

In some embodiments, in the case the vehicle experiences an external force acting in a direction to positively accelerate the vehicle in the direction of travel, the speed control system may be operable to reduce the rate at which the means for applying torque changes the amount of applied torque when an increase in set-speed is commanded, the rate being reduced by an amount that is greater as the size of the external force increases. Thus overshoot of the (new) target set-speed (where the vehicle speed exceeds the set-speed) may be reduced or prevented. It is to be understood that in the case of a vehicle descending a slope, the steeper the gradient, the greater the component of gravitational force tending to cause positive acceleration, and therefore, less accelerating torque is required from the means for applying torque to the one or more wheels. The means for applying torque may comprise an engine, an electric machine or any other suitable means for applying drive torque to one or more wheels.

It is to be understood that in some situations, an increase in powertrain torque may be required in order to accelerate the vehicle to the new set-speed within a defined acceleration corridor (for example at a rate in the range from 0.1 to 0.2 g). In some situations where a gradient is particularly steep, a decrease in brake torque may be required in order to accelerate the vehicle with a value of acceleration that is within the prescribed corridor of values. In either case, the rate of change of powertrain torque and/or braking or retarding torque may be arranged to decrease with increasing gradient.

Conversely, where a force acting on a vehicle is such as to cause positive acceleration, if a decrease in set-speed is requested the speed control system may be operable to change the amount of torque applied to one or more wheels at a rate that increases as the size of the external force increases. This is because the external force is acting in direction that opposes a reduction in the set-speed.

In a situation where a vehicle is experiencing a force in a direction such as to cause negative acceleration in the intended direction of travel, for example in an uphill direction against gravity, or over sandy terrain against drag due to the composition of the terrain, the speed control system may be operable to increase a rate at which torque applied to the one or more wheels is increased when an increase in set-speed is requested, and to decrease the rate at which torque applied to the one or more wheels is decreased when a decrease in set-speed is requested, in order to maintain vehicle acceleration within the prescribed corridor of values.

In other words, in the event that a decrease in set-speed is commanded whilst the vehicle is ascending a slope (where a retarding force is acting on the vehicle) the system may be configured to reduce the rate at which wheel torque is decreased in order to reduce a risk that a vehicle has insufficient wheel torque to overcome the gradient, resulting in the vehicle tending to move backwards down the slope. It is to be understood that if wheel torque is decreased by too great an amount (for example a reduction to zero) whilst ascending a relatively steep slope, a drop in vehicle speed may undershoot excessively the new target set-speed, i.e. fell below the new target speed. In some situations a vehicle may even move backwards down the slope. Accordingly, wheel torque is decreased mere slowly compared with driving on level ground.

In some embodiments, if the vehicle is descending a slope and an increase in set-speed is required, the system may be operable to change the amount of torque applied to one or more wheels at a rate that decreases as a function of increasing gradient.

In some embodiments, the vehicle may be configured to control the rate at which wheel torque is changed responsive to an amount of an external force that is determined to be acting on the vehicle due to a type of terrain or environment over which or through which the vehicle is travelling. It is to be understood that terrain such as sand, mud, wafer or the like may apply a relatively large retarding force to a vehicle. If the vehicle is travelling over a level, sandy or muddy surface and a decrease in set-speed is commanded, the system may be operable to change the amount of torque applied to one or more wheels in order to reduce the vehicle speed to the new set-speed at a rate that decreases as the amount of drag acting on the vehicle increases.

It is to be understood that if the amount of powertrain torque is decreased too rapidly, drag acting on the vehicle may reduce the speed of the vehicle by an amount (and at a rate) that may result in discomfort to one or mere occupants and may result in stopping of the vehicle. Once the vehicle is stopped it may be difficult to enable the vehicle to begin to move again from rest (i.e., gain sufficient traction to begin movement).

Conversely, if an increase in vehicle set-speed is requested, the speed control system may be operable to command an increase in powertrain torque at a rate that increases with the amount of drag acting on the vehicle. This is because powertrain torque must overcome a drag force tending to oppose vehicle acceleration as well as vehicle inertia in order to achieve the new set-speed.

It is to be understood that a vehicle according to an embodiment of the present invention has the advantage that the vehicle may progress over terrain more reliably and with greater composure than a vehicle not having a speed control system according to the present invention. Embodiments of the invention enable a new set-speed to be attained relatively quickly regardless of an amount of force acting to oppose or promote vehicle motion across a surface, enhancing user confidence in the system.

In accordance with one or more examples of one or more of the aspects of the invention, there is provided a speed control system operable in an off-highway condition in which the system commands means for applying torque to one or more wheels to deliver a required torque to the one or more wheels of the vehicle to maintain a prescribed set-speed over ground, the system being operable to allow a user to increase or decrease the set-speed from a current set-speed to a target set-speed, the system being operable to take into account an external force acting on the vehicle to accelerate the vehicle when changing the amount of torque commanded to be applied to the one or more wheels thereby to reduce overshoot or undershoot of the target set-speed.

The means for applying torque may comprise a powertrain and optionally a braking system.

It is to be understood that in some embodiments of the invention, when the speed control system is operating in an off highway speed control mode, the system may be configured to accept a light press of the brake pedal as being indicative of the user's desire to remain in speed control mode but at a reduced speed, whereas a firm press on the brake pedal may indicate that the user wishes to bring the vehicle out of speed control mode and set-speed control to a suspended state until re-activated. In this way, the vehicle may be driven off-road at low speed (for example <30 mph (approximately 50 kph)) without the user needing to touch the pedals, or repeatedly operate controls on the steering wheel. This greatly reduces user workload and improves vehicle composure. It is to be understood that it is often difficult to maintain a constant light pressure on a foot pedal when driving over rough ground as the user often uses their feet to support/steady themselves as the vehicle negotiates off-read obstacles such as ruts or potholes.

It is envisaged that the off-road speed control system may form part of an ATPC (All-Terrain Progress Control) system, which may be arranged to work independently of, or in conjunction with, one or more vehicle control systems arranged to optimise vehicle configurations for a given terrain over which the vehicle is travelling. An example of such a system may be a Terrain Response™ system.

In one embodiment of the proposed speed control system, if the user initiates speed control and the vehicle is travelling below a threshold speed and/or the vehicle has been set to an off-road driving mode (for example via a TR mode selection or selection of a low-ratio gear), or if the vehicle otherwise determines that it is being driven off-road, then the speed control system will operate in an off-road mode and will accept speed adjustment commands via the brake and accelerator pedals whilst remaining in a speed control active mode.

The off-road speed control system may be provided with at least one selected from amongst information in respect of a vehicle's attitude, wheel speed, wheel articulation, gear selection, tyre friction, rolling resistance and selected TR mode. It is to be understood that if the user is using off-road speed control to travel off-road at a slow speed, say 3 mph (approximately 5 kph), and the vehicle is travelling up a steep incline, when the user requests a reduction in cruising set-speed, there may be insufficient torque to maintain progress unless the system takes drag/load-inducing factors into account such as the steepness of the gradient up which the vehicle is travelling. In this way, the off-road speed control system may predict that the requested reduction in speed may result in the moving backwards down the slope, in which case the torque may be reduced more gradually as the steepness of the slope increases. It is to be understood that this is because a slight reduction in torque supplied to the wheels will result in a greater reduction in vehicle speed when ascending a slope than if the vehicle were driving over level ground. In this way, the torque may be accurately controlled in order to achieve a desired set-speed regardless of the gradient and terrain over which the vehicle is travailing. This ensures that vehicular response is intuitive and as expected by the driver who may be inexperienced in off-road driving.

If the vehicle user brings the vehicle to a halt or near stand-still on a steep hill whilst operating the vehicle in off-road speed control mode, then the off-road speed control system may apply the vehicle brakes and balance their effect with an appropriate level of engine torque whilst additionally demanding support from a hill-hold assist system. Hill-hold assist is an automated braking feature arranged to release the brakes during a hill-start only when there is sufficient torque available from the powertrain to prevent unwanted movement of the vehicle. In other words, to prevent the vehicle moving backwards down the hill.

In some embodiments, the off-mad speed control system may be able to control or otherwise influence gear and ratio selection, to ensure that the vehicle is travelling at low speeds off-road in a gear appropriate to avoid engine stalling and maintain suitable progress.

In some embodiments the proposed off-road speed control system may be able to control or otherwise influence operation of the Hill Descent Control (HDC) system automatically to apply the vehicle brakes as the vehicle travels in off-road speed control mode down a steep slope. In this situation, the system will ensure that the vehicle engine is kept running but is not permitted to push the vehicle speed over the desired set-speed.

It is to be understood that in some embodiments a vehicle may be operated in off-road speed control mode in either forward or reverse driving use.

The off-road speed control system may actively look at inputs from traction or stability control systems to determine if the vehicle is still being driven off-road, and manage vehicle speed up to the set-speed where traction is limited by one or more slip events, maintaining speed control operation in order to maintain vehicle progress and momentum in slippery conditions rather than cancelling operation. It is to be understood that if speed control were suddenly cancelled automatically in response to a slip event as in the ease of conventional speed control systems, for example an event in which a traction control system becomes active, a sudden change in vehicle speed due to speed control cancellation may cause the vehicle to break traction altogether or become stuck.

Certain embodiments of the invention will now be described by way of example only. Assume that a vehicle is ascending a gradient having a first location A and a second location B, wherein the gradient at location B is greater than that at location A.

If a user requests a decrease in set-speed from a first speed to a second, lower speed at location A, a low speed progress (LSP) control system of the vehicle is configured to reduce the amount of torque supplied to wheels of the vehicle by the powertrain system at a first rate-in order to reduce the speed of the vehicle to match the new set-speed. The first rate is lower than that which would be employed if the driving surface were level, for a given surface type. This is because a retarding force due to gravity is acting on the vehicle to accelerate the vehicle downhill i.e., in opposition to the direction of travel. The LSP control system reduces powertrain torque and optionally applies a braking system in order to seek to maintain vehicle deceleration within the prescribed corridor. The acceleration corridor may, in some embodiments, be in the range+/−(0.1 g to 0.2 g).

As the vehicle progresses and continues its ascent, it encounters a steeper gradient at location B. If a user requests a similar decrease in set-speed from the first speed to the second speed at location B, the LSP control system is configured to reduce the amount of torque supplied to wheels of the vehicle by the powertrain at a second rate that is lower than the first in order to reduce the speed of the vehicle to match the new set-speed. A reduced rate of powertrain torque reduction is employed because a retarding force acting on the vehicle to accelerate the vehicle downhill is relatively high compared with that at location A and vehicle speed responds relatively quickly to reductions in powertrain torque. The LSP control system controls powertrain torque (and braking system torque) to allow vehicle deceleration to be maintained within the prescribed corridor of +/−(0.1 g to 0.2 g) in the present embodiment. It is to be understood that other values of acceleration corridor are also useful and reference herein to a corridor of (+/−(0.1 g-0.2 g)) is net to be considered to be limiting. It is to be understood that in some circumstances it may be preferred to have a steeper deceleration corridor than acceleration corridor in order to promote user confidence that the system is responding promptly to their commands.

Embodiments of the invention facilitate improved vehicle composure when negotiating different terrain by changing an amount of gain applied to a rising torque request signal compared with a falling torque request signal in dependence on a value of an external accelerating force applied to the vehicle. It is to be understood that the accelerating force may be positive or negative and embodiments of the invention may accommodate positive or negative values of accelerating force. Embodiments of the invention enable vehicle acceleration to be maintained within a prescribed corridor (for example in the range of +/−(0.1 g to 0.2 g)) whereby passenger comfort during acceleration or deceleration events may be preserved.

It is to be understood that where if is determined that an external force is acting against vehicle motion on a surface (for example due to the influence of gravity when ascending an incline or the effects of drag when driving over sandy terrain) the off-road speed control system may be arranged to apply a higher gain to a demand for a positive increase in wheel torque (thereby increasing a rate at which the powertrain delivers an increase in torque to one or more wheels to drive the vehicle) and a lower gain to a demand for negative torque to be applied to the one or more wheels (thereby decreasing a rate at which an increase in retarding force is applied to slow the vehicle). This is because in such a situation an external retarding force is acting to oppose acceleration of the vehicle and thereby oppose torque applied by the powertrain, but is acting in the same sense as brake torque to enhance slowing of the vehicle.

Conversely, where it is determined that an external tome is acting to promote vehicle motion on a surface (for example due to the influence of gravity when descending an incline) the off-road speed control system may be arranged to apply a lower gain to a demand for a positive increase in wheel torque (thereby decreasing a rate at which the powertrain delivers an increase in torque to one or more wheels to drive the vehicle) and a higher gain to a demand for negative torque to be applied to the one or more wheels (thereby increasing a rate at which a retarding force applied to slow the vehicle increases). This is because an external force is acting to promote acceleration of the vehicle and thereby acts in the same sense as torque applied by the powertrain, but is acting against brake torque to reduce slowing of the vehicle.

It is to be understood that by adjusting the gains in the manner described above vehicle behaviour may remain consistent regardless of the terrain over which the vehicle is travelling.

Embodiments of the present invention have the advantage that they may greatly reduce user workload over manual driving and minimise wear and tear on a vehicle by avoiding situations where the vehicle may be left labouring up a gradient without making progress or moving backwards due to insufficient torque being supplied to the wheels by the powertrain.

DESCRIPTION OF THE DRAWINGS

One or more embodiments of the invention will now be described, by way of example only, with reference to the following figures in which.

DETAILED DESCRIPTION

The method and system described herein may be used to control the speed of a vehicle. In one embodiment, the present method and system detect an external force acting on the vehicle as the vehicle is accelerated or decelerated to a target set-speed, wherein the external force has an accelerating or decelerating effect on the vehicle, and then adjust an aspect of the torque applied to one or more wheels of the vehicle to compensate for the effect the external force has on the acceleration or deceleration of the vehicle to the target set-speed.

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present invention.

Figure 1:
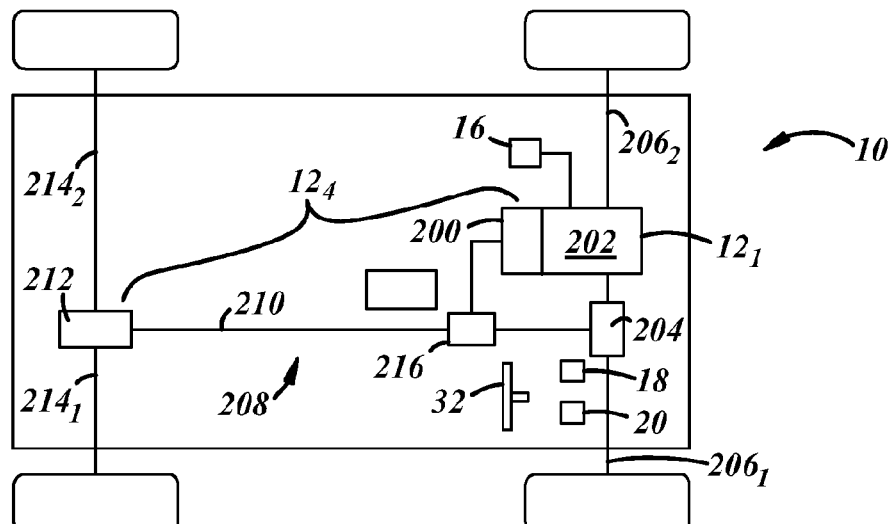
FIG. 1 is a schematic and block diagram of a vehicle.
Figure 2:
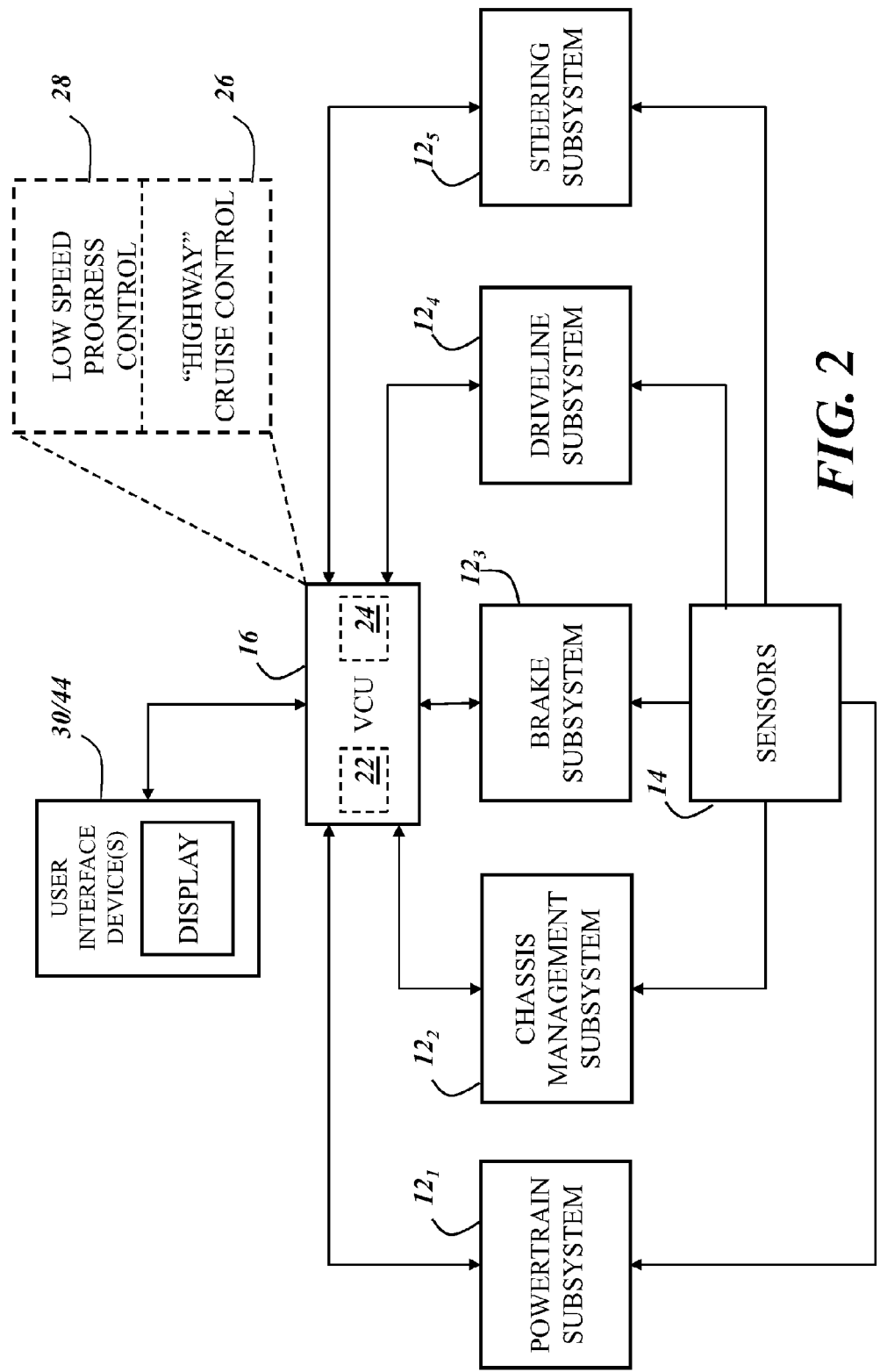
FIG. 2 is another block diagram of the vehicle illustrated in FIG. 1.

With reference to FIGS. 1 and 2, there are shown some of the components of a vehicle 10, with which the present method and system may be used. Although the following description is provided in the context of the particular vehicle 10 illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to one embodiment, vehicle 10 generally includes a plurality of subsystems 12, a plurality of vehicle sensors 14, and a vehicle control unit 16 (VCU 16), among any number of other components, systems, and/or devices not illustrated or otherwise described herein.

Subsystems 12 of vehicle 10 may be configured to perform or control various functions and operations relating to the vehicle and, as illustrated in FIG. 2, may include any number of subsystems, such as, for example, a powertrain subsystem $12_1$, a chassis control or management subsystem $12_2$, a brake subsystem $12_3$, a driveline subsystem $12_4$, and a steering subsystem $12_5$, to cite only a few possibilities.

As is well known in the art, powertrain subsystem $12_1$ is configured to generate power or torque that is used to propel the vehicle. The amount of torque generated by the powertrain subsystem may also be adjusted so as to control the speed of the vehicle (e.g., to increase the speed of vehicle 10, the torque output is increased). The amount of torque that a powertrain subsystem is capable of outputting is dependant upon the particular type or design of the subsystem, as different powertrain subsystems have different maximum output torque capacities. In one embodiment, however, the maximum output capacity of powertrain subsystem 12 of vehicle 10 may be in the order of 600 Nm. As is known in the art, powertrain output torque may be measured using one or more of vehicle sensors 14 described below (e.g., an engine torque sensor, a driveline torque sensor, etc.) or other suitable sensing means and may be used for a variety of purposes by one or more components, modules, or subsystems of vehicle 10. In addition to powertrain subsystem $12_1$, including, for example and without limitation, one or more of those described below. Those having ordinary skill in the art will appreciate that powertrain subsystem $12_1$ may be provided according to any number of different embodiments, may be connected in any number of different configurations, and may include any number of different components, like output torque sensors, control units, and/or any other suitable components known in the art. For example. In an embodiment, powertrain subsystem $12_1$ may further include one or more electric machines, for example, one or more electric machines operable as electrical generators, that are configured to apply retarding torque to a portion of the powertrain subsystem and/or one or more wheels of the vehicle so as to cause the vehicle to decelerate with or without the use of the brake subsystem (e.g., frictional braking). Accordingly, the present invention is not limited to any one particular powertrain subsystem.

Chassis management subsystem $12_2$ may be configured to perform, or may be configured to contribute to the performance of, a number of important functions, including those relating to, for example, traction control (TC), stability control systems (SCS) such as dynamic stability control (DSC), hill descent control (HDC), and steering control, to name only a few. To that end, and as is well known in the art, chassis management subsystem $12_2$ is further configured to monitor and/or control a variety of aspects or operational parameters of the vehicle using, for example, readings, signals, or information it receives from one or more of sensors 14 and/or other vehicle subsystems 12 described or identified herein. For example, subsystem $12_2$ may be configured to receive readings or other information relating to the pressure of the tyres of the vehicle from, for example, tyre pressure sensors associated with each tyre. As such, chassis management subsystem $12_2$ may monitor the tyre pressure and, if necessary, and if the vehicle is so configured, to automatically make, or cause to be made, adjustments to the pressure using an air compressor onboard the vehicle. Similarly, chassis management system $12_2$ may also be configured to receive readings or other information relating to the ride height of the vehicle from, for example, one or more air suspension sensors that may foe distributed about the vehicle. In such an instance, chassis management subsystem $12_2$ may monitor the ride height of the vehicle and, if necessary, and if the vehicle is so configured, to automatically make, or cause to be made, adjustments to the ride height using an air compressor (suspension compressor) onboard the vehicle. Chassis management subsystem $12_2$ may further foe configured to monitor the attitude of the vehicle. More particularly, subsystem $12_2$ may receive readings or information from one or more of sensors 14 and/or subsystems $12_2$ described or identified herein (e.g., gyro sensors, vehicle acceleration sensors, etc.) to evaluate the pitch, roll, yaw, lateral acceleration, vibration (e.g., amplitude and frequency) of the vehicle (and/or the vehicle body, in particular), and therefore, the overall attitude of the vehicle. In each instance, the information received or determined by chassis management subsystem $12_2$ may be utilized solely thereby, as described above, or may alternatively be shared with other subsystems 12 or components (e.g., VCU 16) of vehicle 10 which may use the information for any number of purposes. While only a few examples of operational parameters and/or aspects of the vehicle that chassis management subsystem $12_2$ may monitor and/or control have been provided. It will be appreciated that subsystem $12_2$ may be configured to control and/or monitor any number of other or additional parameters/aspects of vehicle 10 in the same or similar manner as that described above. As such, the present invention is not limited to the control and/or monitoring of any particular parameters/aspect. Moreover, it will be further appreciated that chassis management subsystem $12_2$ may be provided according to any number of different embodiments and may include any number of different components, like sensors, control units, and/or any other suitable components known in the art. Accordingly, the present invention is not limited to any one particular chassis management subsystem.

As illustrated in FIG. 1, driveline subsystem $12_4$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, driveline subsystem $12_4$ also comprises an auxiliary driveline portion 208 arranged to drive the rear wheels of vehicle 10 by means of an auxiliary driveshaft or prop-shaft 210, a rear differential 212, and a pair of rear drive shafts $214_1$, $214_2$. In various embodiments, driveline subsystem $12_4$ may be arranged to drive only the front wheels or the rear wheels, or selectable two wheel drive/four wheel drive vehicles, in an embodiment such as that illustrated in FIG. 1, transmission 200 is releasably connectable to the auxiliary driveline portion 208 by means of a transfer case or power transfer unit 216, allowing selectable two wheel drive or four wheel drive operation. In certain instances, and as is well known in the art, transfer unit 216 may be configured to operate in either a high range (HI) or low range (LO) gear ratio, which may be adjustable by driveline subsystem $12_4$ itself and/or by another component of vehicle 10, such as, for example, VCU 16. Those having ordinary skill in the art will appreciate that driveline subsystem $12_4$ may be provided according to any number of different embodiments, may be connected in any number of different configurations, and may include any number of different components, like sensors (e.g., HI/LO ratio sensor, transmission gear ratio sensors, etc.), control units, and/or any other suitable components known in the art. Accordingly, the present invention is not limited to any one particular driveline subsystem.

In addition to those subsystems described above, vehicle 10 may further comprise any number of other or additional subsystems, such as, for example, a brake subsystem $12_3$ and a steering subsystem $12_5$. For the purposes of this invention, each of the aforementioned subsystems 12, and the functionality corresponding thereto, is conventional in the art. As such, detailed descriptions will not be provided; rather, the structure and function of each identified subsystem 12 will be readily apparent to those having ordinary skill in the art.

In one embodiment, one or more of subsystems 12 may be under at least a certain degree of control by VCU 16. In such an embodiment those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem $12_1$ as an example, powertrain subsystem $12_1$ may be configured to gather various types of information relating to certain operating parameters thereof, such as, for example, torque output, engine or motor speed, etc., and to then communicate that information to VCU 16. This information may be gathered from, for example, one or more of vehicle sensors 14 described below. Powertrain subsystem $12_1$ may also receive commands from VCU 16 to adjust certain operating parameters when, for example, a change in conditions dictates such a change (e.g., when a change in vehicle speed has been requested via a brake pedal (pedal 18 in FIG. 1) or accelerator pedal (pedal 20 in FIG. 1) of vehicle 10). While the description above has been with particular reference to powertrain subsystem $12_1$ it will be appreciated that the same principle applies to each such other subsystem 12 that is configured to exchange information/commands with VCU 16.

Each subsystem 12 may comprise a dedicated electronic control unit (ECU) that is configured to receive and execute instructions or commands provided by VCU 16, and/or to perform or control certain functionality independent from VCU 16. Alternatively, two or more subsystems 12 may share a single ECU, or one or more subsystems 12 may be directly controlled by the VCU 16 itself. In an embodiment wherein a subsystem 12 communicates with VCU 16 and/or other subsystems 12, such communication may be facilitated via any suitable connection, such as, for example, a controller area network (CAN) bus, a system management bus (SMBus), a proprietary communication link, or through some other arrangement known in the art.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present invention.

Vehicle sensors 14 may comprise any number of different sensors, components, devices, modules, systems, etc. In one embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to vehicle 10 and the operation and configuration thereof, and may include, for example and without limitation, any one or more of: wheel speed sensor(s); ambient temperature sensor(s); atmospheric pressure sensor(s); tyre pressure sensor(s); gyro sensor(s) to detect yaw, roll, and pitch of the vehicle; vehicle speed sensor(s); longitudinal acceleration sensor(s); engine torque sensor(s); driveline torque sensor(s); throttle valve sensor(s); steering angle sensor(s); steering wheel speed sensor(s); gradient sensor(s); lateral acceleration sensor(s) on, for example, the stability control system (SCS); brake pedal position sensor(s); brake pedal pressure sensor(s); accelerator pedal position sensor(s); air suspension sensor(s) (i.e., ride height sensors); wheel position sensors); wheel articulation sensor(s); vehicle body vibration sensor(s); water detection sensor(s) (for both proximity and depth of wading events); transfer case HI-LO ratio sensor(s); air intake path sensor(s); vehicle occupancy sensor(s); and longitudinal lateral, and vertical motion sensor(s), among others known in the art.

The sensors identified above, as well as any other sensors that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 may receive certain information from the ECU of a subsystem 12 rather than directly horn a sensor 14. It should be appreciated that the foregoing scenarios represent only some of the possibilities, as vehicle 10 is not limited to any particular sensor(s) or sensor arrangement(s); rather any suitable embodiment may be used.

VCU 16 may comprise any suitable ECU, and may include any variety-of electronic process devices, memory devices, input/output (I/O) devices, and/or other known components, and perform various control and/or communication related functions. In one embodiment, VCU 16 includes an electronic memory device 22 that may store various information, sensor readings (e.g., such as these generated by vehicle sensors 14), look-up tables or other data structures (e.g., such as those used in the performance of the method described below), algorithms (e.g., the algorithms embodied in the method described below), etc. in an embodiment, memory device 22 comprises a carrier medium carrying a computer-readable code for controlling the vehicle to carry out the method described below. Memory device 22 may also store pertinent characteristics and background information pertaining to vehicle 10 and subsystems 12. VCU 16 may also include an electronic processing device 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to other vehicle devices, modules, subsystems, and components (e.g., sensors) via suitable vehicle communications and can interact with them when or as required. In addition to the functionality that may be performed by VCU 16 described elsewhere herein, in one embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above, in one embodiment, vehicle 10 may further comprise one or more vehicle speed control systems. For example and with continued reference to FIG. 2, in one embodiment, vehicle 10 may further comprise a cruise control system 26, also referred to as an "on-highway" or "on-road" cruise control system, and a low-speed progress (LSP) control system 28, which may be referred to an "off-highway" or "off-road" progress control system.

On-highway cruise control system 26, which may comprise any number of conventional cruise control systems known in the art, is operable to automatically maintain vehicle speed at a desired "set-speed" set by the user. Such systems are generally limited in their use in that the vehicle must be traveling above a certain minimum threshold speed (e.g., 30 mph (approximately 50 kph)) for the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 26 may be integrated into another subsystem 12 of vehicle 10 (e.g., powertrain subsystem 12₁), or for example, VCU 16 (as is illustrated in FIG. 2).

Figure 3:
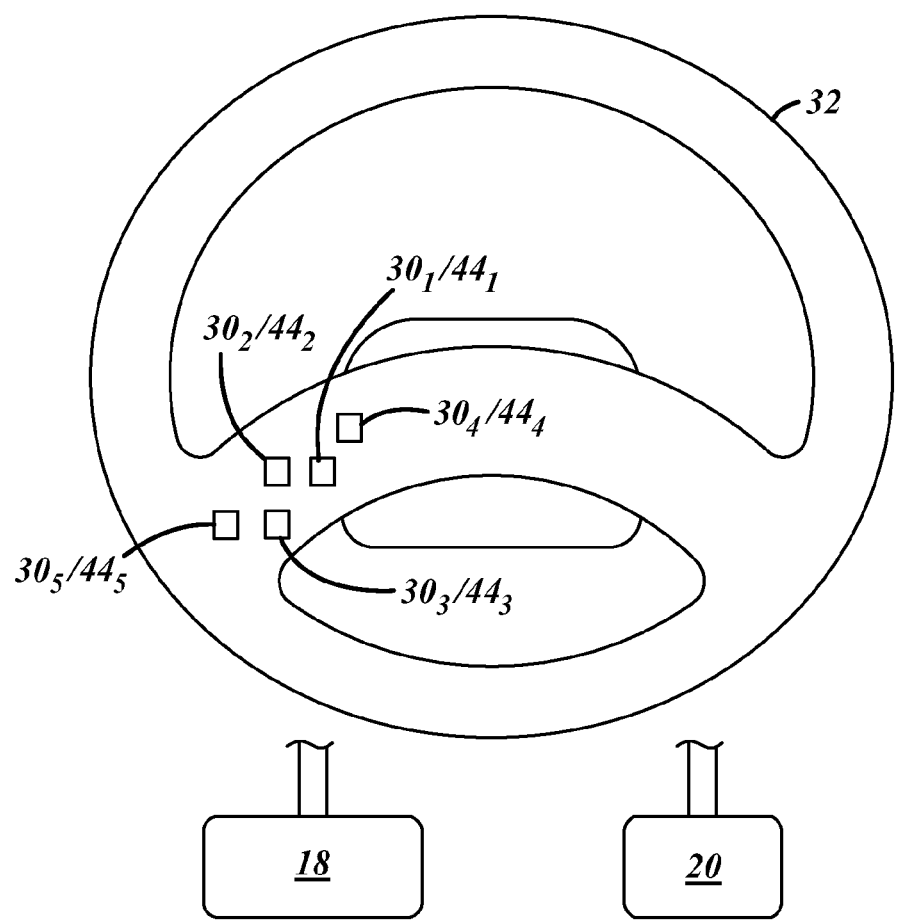
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, center console, etc.). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button 30₁ that when manipulated in a particular manner may activate the operation of cruise control system 28 and also set the desired set-speed. Cruise control system 26 may further comprise one or more other user-selectable interlace devices (e.g., buttons) to allow the user to increase or decrease the set-speed of the system. For example, a "+" button 30₂ may be provided to allow the user to increase the set-speed in discrete increments (e.g., 1 mph (or 1 kph)), and a "−" button 30₃ to allow the user to decrease the set-speed in the same or different discrete increments. Alternatively, the "+" and "−" buttons 30₂, 30₃ may be integrated into a single user-selectable device. Additional user-selectable interface devices of system 26 may include, for example, a "cancel" button 30₄ to deactivate or suspend the system, as well as a "resume" button 30₅ to allow for the system to be re-activated following a temporary suspension or deactivation of the system function.

It should be appreciated that the foregoing scenarios represent only some of the possibilities of cruise control system 26 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without any pedal inputs being required by the user. This low-speed progress control function differs from that of cruise control system 26 in that unlike cruise control system 26, the vehicle need not be traveling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user depresses the brake or the clutch pedals, for example, the on-read cruise control function is cancelled and the vehicle reverts to a manual mode of operation requiring user pedal input to maintain vehicle speed. In addition, in at least certain cruise control systems, the detection of a wheel slip event, which may be initiated by a loss of traction, may also have the effect of cancelling the cruise control function. LSP control system 28 may also differ from such cruise control systems in that, in at least one embodiment, if is configured in such a way that the speed control function provided thereby is not cancelled or deactivated in response to those events described above. In an embodiment, LSP control system 28 is particularly suited for use in off-road or off-highway driving.

In one embodiment, LSP control system 28 includes, among potentially other components, an ECU 42 (shown, in the illustrated embodiment and for reasons described below, as comprising VCU 16) and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example; detecting an external force acting on the vehicle that may affect vehicle acceleration/deceleration; automatically adjusting the torque applied to one or more wheels of the vehicle to compensate for the effect external forces may have on vehicle acceleration; determining the type and/or characteristics of the terrain over which vehicle 10 is traveling; etc. Further, in one embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarify, the description below will be with respect to an embodiment wherein the functionality of ECU 42 is integrated or incorporated into VCU 16, such that as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, data (e.g., predefined set-speeds), sensor readings, look-up tables or other data structures, algorithms, software, and the like, required for performing the functionality of LSP control system 28, including that embodied in the method described below.

As with on-highway cruise control system 26 described above, LSP control system 28 further comprises one or more user interlace devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of predefined set-speeds, switch between two or more predefined set-speeds, and otherwise interact with system 28 as may be described below. These user interface devices may also allow for system 28 to provide certain notifications, alerts, messages, requests, etc. to the user. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc). In one embodiment, user interface devices 30, 44 of on-highway cruise control system 26 and LSP control system 28, respectively, are arranged adjacent to one another within vehicle 10, and, in one embodiment, on steering wheel 32 of vehicle 10. However, in other embodiments, such as, for example, that described herein, on-highway cruise control system 28 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

For purposes of illustration and in addition to the functionality of LSP control system 28 described below, a description of the general operation of one illustrative embodiment of LSP control system 28 will now be provided. First, VCU 16, which in the embodiment described herein comprises the ECU of LSP control system 28, determines the desired speed at which the vehicle is to travel (referred to herein as "the desired set-speed"). This may be a set-speed selected by the user via user interface devices 44, or alternatively, VCU 16 may be configured to automatically determine or select a desired set-speed based on certain conditions or factors and without any user involvement. In either instance, in response to the selection of the desired set-speed, VCU 16 is configured to cause the vehicle to operate in accordance with the desired set-speed by effecting the application of selective powertrain, traction control, and/or braking actions to the wheels of the vehicle, collectively or individually, to either achieve or maintain the vehicle at the desired set-speed. In one embodiment, this may comprise VCU 16 generating and sending appropriate commands to the appropriate subsystems 12 (such as powertrain subsystem $12_1$ and brake subsystem $12_3$), for example, and/or directly controlling the operation of one or more components, modules, subsystems, etc, of vehicle 10.

Figure 4:
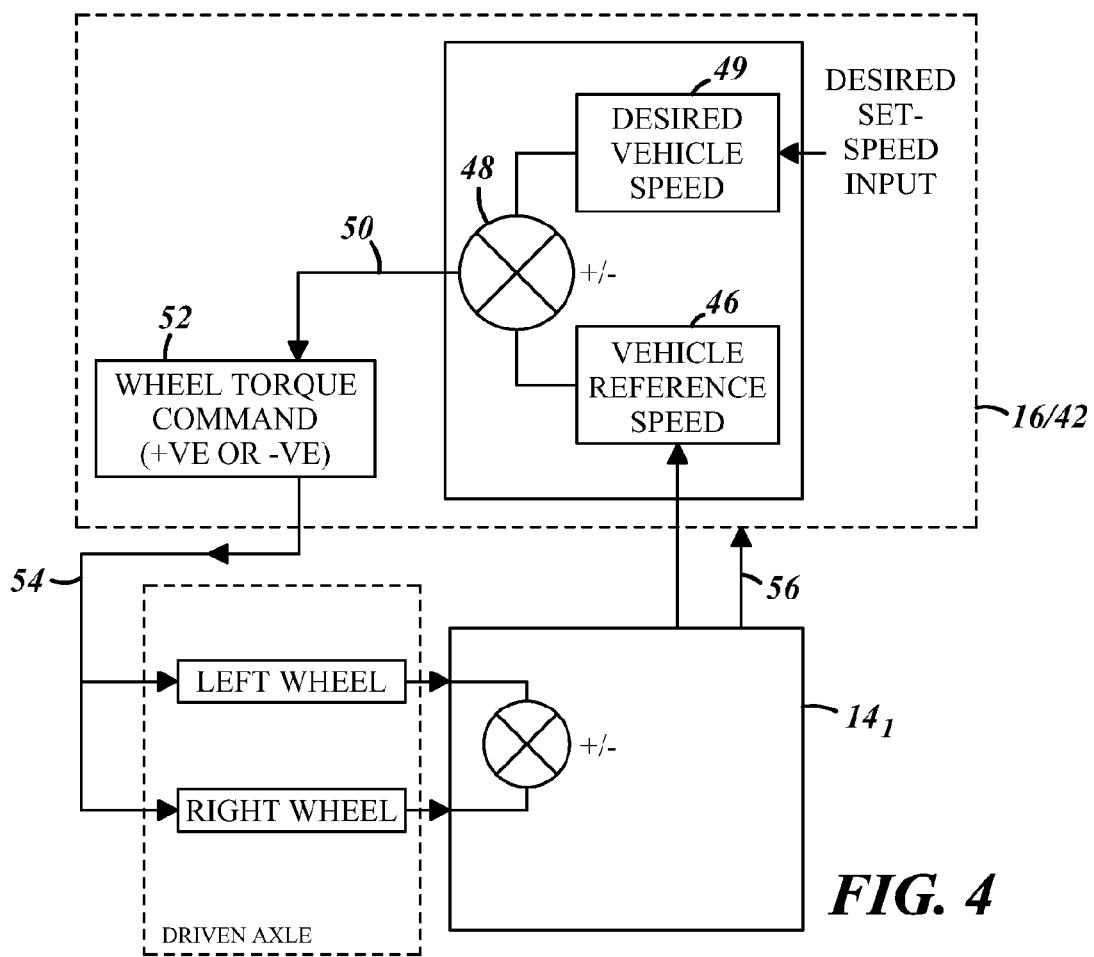
FIG. 4 is a schematic and block diagram illustrating the operation of art example of a speed control system of a vehicle, such as the vehicle illustrated in FIGS. 1 and 2.

More particularly, and with reference to FIG. 4, once the desired set-speed is determined, a vehicle speed sensor (identified as sensor $14_1$ in FIG. 4) associated with the vehicle chassis or driveline provides a signal 46 indicative of vehicle speed to VCU 16. In one embodiment, VCU 16 includes a comparator 48 which compares the desired set-speed (represented with reference numeral 49 in FIG. 4) with the measured speed 46, and provides an output signal 80 indicative of the comparison. The output signal 60 is provided to an evaluator unit 52, which interprets the output signal 50 as either a demand for additional torque to be applied to the vehicle wheels by, for example, powertrain subsystem $12_1$ or for a reduction in torque to be applied to the vehicle wheels, by, for example, brake subsystem $12_3$, depending en whether the vehicle speed needs to be increased or decreased to maintain or achieve the desired set-speed, and in the latter instance, to do so in accordance with a predetermined or prescribed acceleration profile, an acceleration corridor (e.g., +/−(0.1 g-0.2 g)), or both. An output 54 from the evaluator unit 52 is then provided to one or more subsystems 12 so as to manage the torque applied to the wheels, depending on whether there is a positive or negative demand for torque from the evaluator unit 52. In order to initiate the necessary positive or negative torque being applied to the wheels, the evaluator unit 52 may either command that additional power is applied to the vehicle wheels and/or that a braking force is applied to the vehicle wheels, either or both of which may be used to implement the change in torque that is necessary to achieve or maintain the desired vehicle set-speed. Synchronized application of positive and negative torque to the wheels to control the net torque applied thereto and is commanded by LSP control system 28 to maintain vehicle stability and composure and regulate torque applied across each axle, in particular, in the event of a slip event occurring at one or more wheel, in certain instances, VCU 16 may also receive a signal 56 indicative of a wheel slip event having occurred. In such embodiments, during a wheel slip event, VCU 16 continues to compare the measured vehicle speed with the desired set-speed, and continues to control automatically the torque applied across the vehicle wheels so as to maintain vehicle speed at the desired set-speed and manage the slip event.

In addition to the functionality described above, in one embodiment, LSP control system 28 may be further configured to detect, sense, derive, or otherwise determine information relating to the terrain over which vehicle 10 is traveling (e.g., surface type, terrain classification, terrain or surface roughness, etc.). In accordance with one embodiment, VCU 16 may be configured to perform this function and to do so in a number of ways. One such way is that described in UK Published Application No. GB2492748A published on 16 Jan. 2013, the entire contents of which are incorporated herein by reference. More particularly, in one embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of terrain and, in certain instances, one or more characteristics thereof, such as, for example, the classification, roughness, etc. of the terrain.

More specifically, in one embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is traveling over rocky terrain), aerodynamic drag, and lateral vehicle acceleration.

The estimator module also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude vertical wheel excitement indicative of a washboard type surface). The SCS activity signal is derived from several outputs from the ECU of a stability control system (SCS), which contains a dynamic stability control (DSC) function, a terrain control (TC) function, anti-lock braking system (ABS) and hill descent control (HDC) algorithms, indicating DSC activity, TC activity, ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a four wheel vehicle, compares outputs across each axle and from front to rear on each side, to determine a wheel speed variation and corrugation detection signal.

In one embodiment, and in addition to the estimator module, a road roughness module may also be inducted for calculating the terrain roughness based on air suspension sensors (the ode height or suspension articulation sensors) and wheel accelerometers. In such an embodiment, a terrain indicator signal in the form of a roughness output signal is output from the road roughness module.

The estimates for the wheel longitudinal slip and the lateral friction estimation can be compared with one another within the estimator module as a plausibility check. Calculations for wheel speed variation and corrugation output, the surface rolling resistance estimation, the wheel longitudinal slip and the corrugation detection, together with the friction plausibility check, are then output from the estimator module and provide terrain indicator output signals, indicative of the nature of the terrain over which the vehicle is traveling, for further processing by VCU 16. For example, the terrain indicators may be used to determine which of a plurality of vehicle subsystem control modes (e.g., terrain modes) is most appropriate based on the indicators of the type of terrain over which the vehicle is traveling, and to then automatically control the appropriate subsystems 12 accordingly.

In another embodiment, rather than LSP control system 28 performing the above-described terrain sensing/detecting functionality, another component, module, or subsystem of vehicle 10, such as, for example VCU 16 (in the case where it does not perform the functionality of LSP control system 28), chassis management subsystem 12$_2$, or another suitable component may be appropriately configured to do so, and such other embodiments remain within the spirit and scope of the present invention.

It should be appreciated that the foregoing description of the arrangement, functionality, and capability of LSP control system 28 has been provided for purposes of example and illustration only and is not meant to be limiting in nature. Accordingly, LSP control system 28 is not intended to be limited to any one particular embodiment or arrangement.

Again, the preceding description of vehicle 10 and the illustrations in FIGS. 1 and 2 are only intended to illustrate one potential vehicle arrangement and to do so in a general way. Any number of other vehicle arrangements and architectures, including those that differ significantly from the one shown in FIGS. 1 and 2, may be used instead.

Figure 5:
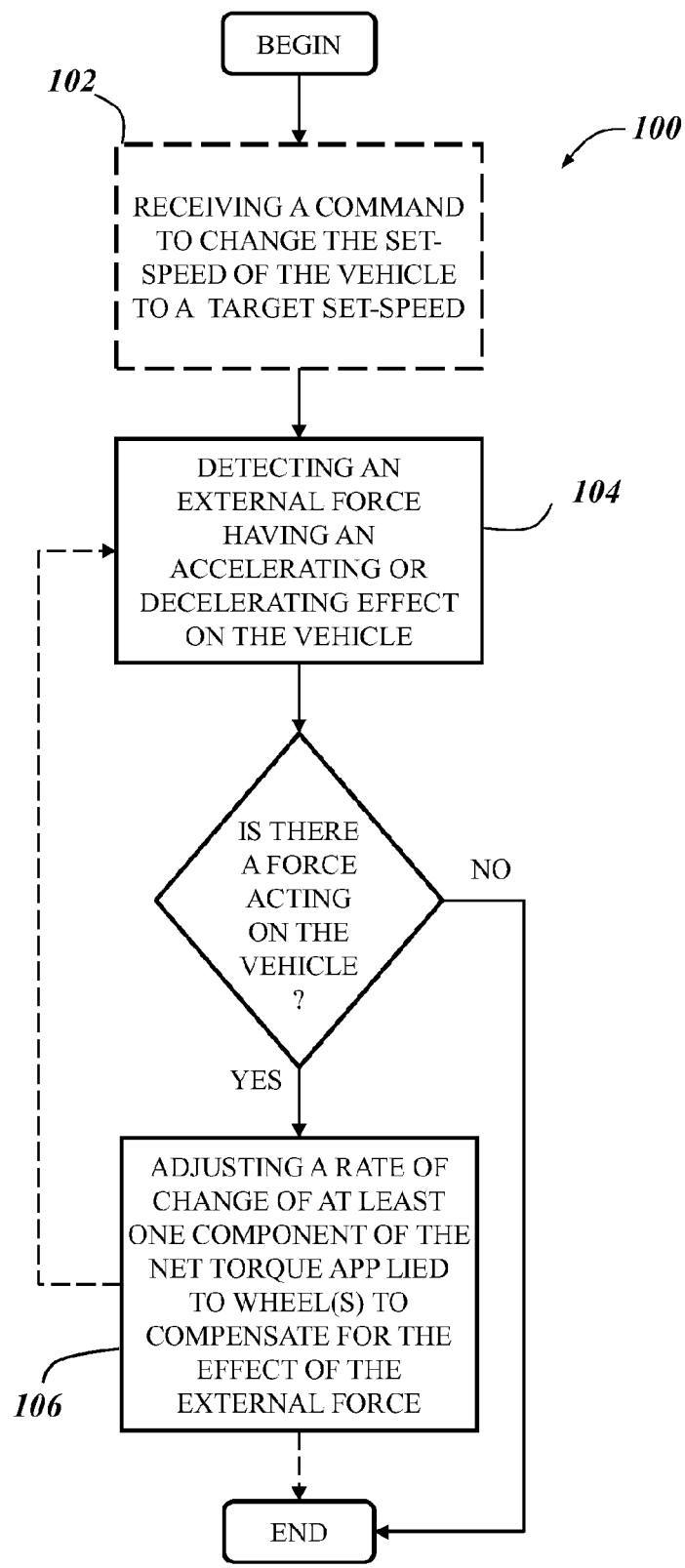
FIG. 5 is a flow diagram of a method for controlling the speed of a vehicle, such as the vehicle illustrated in FIGS. 1 and 2.

Turning now to FIG. 5, there is shown an example of a method 100 for controlling the speed of a vehicle through the operation of a speed control system. For purposes of illustration and clarity, method 100 will be described in the context of vehicle 10 illustrated in FIGS. 1 and 2 and described above. More specifically, method 100 will be described in the context of the low-speed progress (LSP) control system 28 of vehicle 10, which, for purposes of illustration, is integrated in VCU 16 (i.e., VCU 16 comprises ECU 42 of LSP control system 28). It will be appreciated however, that the application of the present methodology is hot meant to be limited solely to such an arrangement, but rather method 100 may find application with any number of other speed control system arrangements, including, for example, LSP control systems other than that described above (e.g., not integrated into the VCU of a vehicle, and/or the VCU does net comprise the ECU of the speed control system), as well as, in certain instances, conventional "on-highway" cruise control systems, such as, for example, cruise control system 26 described above. Accordingly, the present invention is not meant to be limited to any one particular arrangement or type of speed control system. Additionally, it will be appreciated that the performance of method 100 is not meant to be limited to any one particular order or sequence of steps.

In an embodiment, method 100 comprises a step 102 of receiving a command to change the set-speed of the vehicle, and the speed control system thereof, in particular, from a first or current set-speed to a second or target set-speed. This command may be received from a number of sources, and as such, this step may be performed in a number of ways.

In one embodiment, step 102 comprises receiving a user input corresponding to the desired target set-speed. In such an embodiment, the user may select a target set-speed using one or more user interface devices (e.g., user interface devices 44). This may entail, for example, selecting the target set-speed from among a plurality of predefined set-speeds stored in a memory device of or accessible by the speed control system (e.g., memory device 22 of VCU 16), or alternatively, may comprise the user manipulating one or more user interface devices to incrementally adjust the set-speed to the target set-speed. Whether the target set-speed is selected from one or more predefined set-speeds or is incrementally adjusted, one or more electrical signals representing the user's selection are received and used by the speed control system (e.g., VCU 16) to determine the target set-speed.

It will be appreciated that examples of selecting or defining a target set-speed other than those described above may certainly be suitable, such as, for example, using one or both of the brake and accelerator pedals in the same or similar manner described elsewhere above, end therefore, the present invention is not limited to any one particular technique by which a user may select or define a target set-speed.

In another embodiment, in addition to or instead of allowing the user to manually select a desired set-speed, step 102 may comprise the speed control system automatically selecting the target set-speed. More particularly, in some embodiments, step 102 may comprise automatically selecting a desired set-speed based on one or more predetermined conditions relating to the vehicle. One such condition may relate to the terrain over which the vehicle is traveling, and step 102 may comprise automatically selecting a new target set-speed when it is determined that the vehicle has transitioned to a terrain or a characteristic of the terrain that is either not associated with the current set-speed or for which the current set-speed is inappropriate or less than optimal. In one embodiment, this may comprise acquiring or determining terrain-related information in the same or similar manner as that described above, for example, and then utilizing a data structure (e.g., look-up table) correlating terrain with set-speeds, or some other terrain/set-speed profile, to determine one or more set-speeds that are associated with that terrain. A comparator or another known technique may then be used to compare the current set-speed with that associated with the new terrain to determine if a change is needed, and if it is, to select the appropriate new set-speed, in other embodiments, other conditions may be used in conjunction with or independently of those described above, and may include, for example and without limitation, those relating to a particular mode (e.g., terrain mode) the vehicle is currently operating in, factors or conditions relating to vehicle composure, such as, for example, lateral and vertical acceleration of the vehicle, gear ratio of the vehicle driveline (e.g., transmission or PTU), ride height, wheel articulation, and vehicle seat occupancy. Accordingly, it will be appreciated that any number or combination of conditions/factors may be evaluated and used in step 102, each of which remains within the spirit and scope of the present invention. In one embodiment, the above described functionality of step 102 may be performed by VCU 16 or another suitable component of the vehicle.

In an embodiment wherein method 100 is utilized to maintain the speed of the vehicle as opposed to controlling the speed of the vehicle as the vehicle accelerates or decelerates between a first, previously-defined set-speed and a target set-speed, step 102 may be optional. Accordingly, embodiments wherein method 100 does not include step 102 remain within the spirit and scope of the present invention.

Once the target set-speed is known, be it from the selection in step 102 or otherwise, the vehicle may be operated in accordance with the target set-speed, and in an embodiment, is done so in accordance with a given acceleration profile, which may comprise an acceleration corridor comprising a range between a desired acceleration and a maximum desired acceleration. In an embodiment, the acceleration corridor may be in the order of +/−(0.1 g-0.2 g). In one embodiment, and in general terms, the operation of the vehicle in accordance with the target set-speed may comprise generating one or more electrical signals representative of the target set-speed and communicating that, or those signals, to the appropriate vehicle subsystem (e.g., powertrain subsystem $12_1$, brake subsystem $12_3$, etc.) to cause the vehicle to accelerate or decelerate to match the target set-speed, which may include maintaining the vehicle speed at the target set-speed (for example, if external forces cause the vehicle to slow down or speed up, the system will change the net torque at one or more wheels to accelerate or decelerate the vehicle to return to or match the set-speed) and/or bringing the vehicle speed up or down from a first set-speed to the target set-speed.

Figure 6:
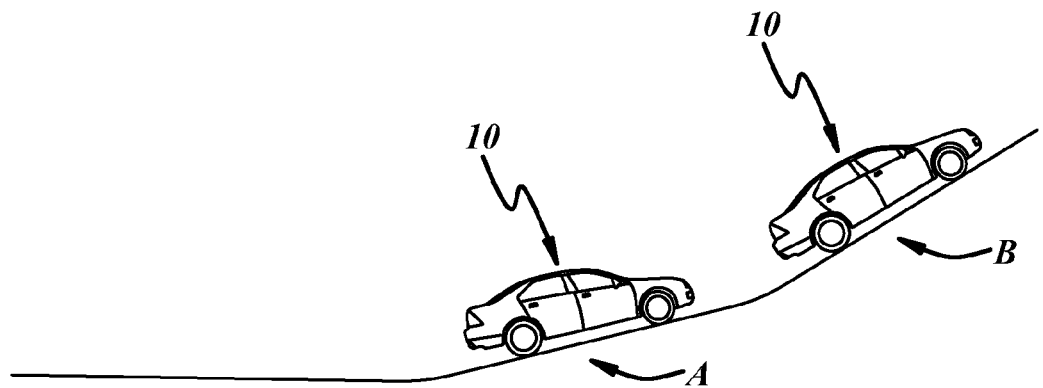
FIG. 6 is shows a vehicle according to an embodiment of the present invention ascending a slope at two different locations, each location having a different respective gradient.

The process of adjusting the speed of the vehicle to match the target set-speed, and do to so in accordance with a predetermined or prescribed acceleration profile and/or acceleration corridor, is relatively straightforward when the vehicle is traveling over terrain that is relatively flat and presents minimal rolling resistance to the progression of the vehicle (e.g., a flat, paved road). The same cannot be said, however, when the vehicle is traveling in an environment where there are external forces acting on the vehicle that cause the vehicle to either accelerate or decelerate undesirably. For example, FIG. 6 shows vehicle 10 ascending a gradient at two different locations, A and B. At both location A and location B, there is a gravitational force acting on vehicle 10 that has a decelerating effect on movement or progression of vehicle 10 up the gradient, with the effect being greater at location B since location B is steeper than location A. In such instances, the acceleration or deceleration, as the case may be, caused by these external forces may combine with the torque applied to one or more wheels of the vehicle by, for example, the powertrain subsystem and/or brake subsystem, to cause the vehicle to overshoot (exceed) or undershoot (fall below) the target set-speed. Additionally, changing the torque at a rate without taking into consideration other external forces acting on the vehicle, to accelerate or decelerate the vehicle, may cause a slip event.

For example, assume that the set-speed of a vehicle is reduced in step 102 from a first set-speed to a lower target set-speed. As a result, the braking subsystem of the vehicle (and/or, in certain embodiments, the powertrain subsystem) is commanded to apply a certain amount of retarding torque required to bring the speed of the vehicle down to the new target set-speed, and to do so in accordance with a predetermined or prescribed acceleration profile and/or acceleration corridor. Assume further, however, that the vehicle is ascending a gradient (e.g., as shown in FIG. 6) or is operating in a high drag/high rolling resistance environment when the change in set-speed is commanded and the vehicle is being decelerated, to match that target set-speed. If the vehicle is traveling up-hill, a gravitational force acts on the vehicle in a direction that is opposite the direction of travel, and as such, a decelerating force acts on the vehicle. Similarly, if the vehicle is operating in a high drag/high rolling resistance environment (e.g., sand, mud, etc., or is wading through water), a decelerating force may act on the vehicle, in either instance, when this decelerating force is combined with the deceleration of the vehicle caused by, for example, the retarding torque being applied to one or more wheels thereof, it may have the effect of the vehicle speed undershooting (i.e., falling below) the new target set-speed, which may be undesirable for a number of reasons, not the least of which is that at a lower speed and a sufficiently large amount of decelerating force, the vehicle may actually roll in the direction opposite the direction of travel (e.g., roll backwards) down the gradient, or may get stuck in the high drag/high rolling resistance terrain (e.g., sand, mud, water, etc.). Alternatively, even if undershoot does not occur, the combined retarding torque and external forces may decelerate the vehicle at a rate in excess of a desired deceleration, or at a rate greater than that expected by the user/driver which may be a source of irritation for the driver.

In another example, assume once again that the vehicle is ascending a gradient or operating in a high drag/high rolling resistance environment, but that now the set-speed of a vehicle is increased in step 102 from a first set-speed to a higher target set-speed. As a result, the powertrain subsystem of the vehicle is commanded to apply a certain amount of drive torque required to bring the speed of the vehicle up to the new set-speed, and to do so in accordance with a predetermined or prescribed acceleration profile and/or acceleration corridor. Because the vehicle is traveling up-hill or in a high drag/high rolling resistance environment, a decelerating force is acting on the vehicle. When this decelerating force is combined with the acceleration of the vehicle caused by the drive torque being applied to one or more wheels thereof, it may have the effect of the vehicle speed falling short of the new set-speed, or achieving the set-speed outside of an acceleration corridor, for example, which may foe undesirable for a number of reasons, including that describe in the example above. This may, for example, result in an acceleration below that expected by the user/driver, which although not a cause of concern for the control of the vehicle, does not enhance the driving experience and may be a source of irritation for the driver.

In yet another example, assume now that the vehicle is descending a gradient or is otherwise operating in an environment where an accelerating force acts on the vehicle. Assume further that the set-speed of a vehicle is increased in step 102 from a first set-speed to a higher target set-speed. As a result, the powertrain subsystem of the vehicle is commanded to apply a certain amount of drive torque required to bring the speed of the vehicle up to the new target set-speed, and to do so in accordance with a predetermined or prescribed acceleration profile and/or acceleration corridor. When the accelerating force acting on the vehicle due to gravity or otherwise is combined with the acceleration of the vehicle caused by the drive torque being applied to one or more wheels thereof. It may have the effect of the vehicle speed overshooting (i.e., going past the target set-speed), which may be undesirable for a number of reasons, not the least of which is that it may alarm the user and adversely affect the composure of the vehicle.

Finally, in yet still another example, assume once again that the vehicle is descending a gradient or otherwise operating in an environment where an accelerating force acts on the vehicle, but that the set-speed of a vehicle is decreased in step 102 from a first set-speed to a lower target set-speed. As a result, the braking subsystem of the vehicle is commanded to apply a certain amount of retarding torque required to bring the speed of the vehicle down to the new target set-speed, and to do so in accordance with a predetermined or prescribed acceleration profile and/or acceleration corridor. When the accelerating force acting on the vehicle due to gravity or otherwise is combined with the deceleration of the vehicle caused by the drive torque being applied to one or more wheels thereof, it may have the effect of the vehicle speed falling short of the target set-speed, or achieving the set-speed outside of an acceleration corridor, for example, which may be undesirable for a number of reasons, including that describe in the example above.

In order to prevent or at least minimize the conditions described above, and therefore, improve user comfort, vehicle composure, and/or and make the speed control system more intuitive, it would be advantageous to compensate for the acceleration or deceleration caused by external forces acting on the vehicle while, for example, the speed of the vehicle is being adjusted from one set-speed to another or when otherwise maintaining the speed of the vehicle at a target speed.

Accordingly, and with reference to FIG. 5, in an embodiment, method 100 comprises a step 104 of detecting an external force acting on the vehicle having an accelerating or decelerating effect on the vehicle such that it may cause the vehicle to accelerate or decelerate. In other words, step 104 detects an accelerating or decelerating force that is acting on the vehicle as a result of the external environment in which the vehicle is operating. Step 104 may be performed in a number of ways.

In an embodiment, the longitudinal acceleration of vehicle 10 and the torque applied to one or more wheels thereof may be taken into account along with a predetermined or prescribed acceleration profile. More particularly, as the speed of the vehicle is adjusted (i.e., increased or decreased) to match the target set-speed, the longitudinal acceleration of the vehicle and one or more components of the net torque applied, to the wheels thereof—whether drive torque or retarding torque—are monitored in view of prescribed acceleration profile. Both the longitudinal acceleration and applied torque may be monitored using, for example, information or readings acquired from one or more vehicle sensors 14 (e.g., wheel speed sensors, longitudinal acceleration sensors, vehicle speed sensors, etc., in the case of the longitudinal acceleration; and torque sensors, in the case of the torque), one or more vehicle subsystems 12 (e.g., powertrain subsystem $12_1$, brake subsystem $12_3$, etc.), and/or any other suitable component of vehicle 10. If, at a given applied torque, the longitudinal acceleration tracks or is in-line with the acceleration profile, no action is taken as the vehicle is accelerating as it is expected to. Alternatively, however, if the longitudinal acceleration of the vehicle diverges from the profile (or at least diverges more than a predefined acceptable amount or for a more than predetermined amount of time), or is otherwise not as expected, then it can be determined that an external force affecting vehicle acceleration may be acting on the vehicle. For example, if the longitudinal acceleration exceeds that which is expected from the acceleration profile, then it may be determined and detected that an accelerating force is acting on the vehicle (e.g., the vehicle is descending a gradient or is traversing a terrain that otherwise results in an accelerating force being applied to the vehicle). Conversely, if the longitudinal acceleration falls below the that which is expected from the acceleration profile, then if may be determined and detected that a decelerating force is acting on the vehicle (e.g., the vehicle is ascending a gradient or is traversing a high drag terrain that results in a decelerating force being applied to the vehicle). In an embodiment, this functionality may be performed by VCU 16, and, for example, as part of the operation of a PID controller embodied in software therein, in particular; while in other embodiments, it may be performed by another suitable component of vehicle 10.

Skilled artisans will foe appreciate that techniques other than that described above may also be utilized to detect the existence of an external force acting on the vehicle. These techniques may involve the use of various vehicle-related information in addition to or instead of that described above. For example, in certain embodiments, information relating to one or more operating parameters of the vehicle may be evaluated (e.g., compared to respective thresholds) and used to detect an external force acting on the vehicle. These parameters may include, for example and without limitation, tyre friction, wheel speed, gear selection, wheel articulation, and parameters relating to vehicle body attitude (e.g., pitch), to cite a few possibilities. In other embodiments, vehicle-related information in addition to or instead of that described above may be evaluated and used. For example, information relating to the terrain the vehicle is traversing may be utilized. This may include, for example, the particular type of terrain (e.g., sand, grass, mud, wafer, etc.), the grade of the terrain, the roughness of the terrain surface, etc. One or more electrical signals representative of the pertinent vehicle-related information may be received from, for example, one or more vehicle sensors (e.g., sensors 14), one or more vehicle subsystems (e.g., subsystems 12), and/or memory devices (e.g., memory device 22 of VCU 16). This information may then be evaluated and used to defect the presence of an external force using techniques known in the art. As with the embodiment described above, this functionality may be performed by VCU 16 or another suitable component of vehicle 10.

When it is detected in step 104 that an external force having an accelerating or decelerating effect is acting on vehicle 10, method 100 moves to step 106 which attempts to compensate for this external force and its effect. More particularly, step 106 comprises adjusting one or more aspects of a torque applied to one or more of the vehicle wheels in order to compensate for the accelerating/decelerating effect of the external force on the vehicle, and to thereby cause the vehicle to accelerate or decelerate in a more expected manner (e.g., in accordance with a prescribed acceleration profile and/or acceleration corridor) and with minimal or no overshoot or undershoot of the target set-speed. Step 106 may be performed in a number of ways.

In an embodiment, the aspect of the torque that is adjusted in step 106 is the rate at which at least one component of the net torque being applied to one or more wheels of the vehicle is changed (i.e., increased or decreased), it will be appreciated in view of the description below that the component of the net torque being adjusted may be: a drive torque generated by, for example, the powertrain subsystem: a retarding torque generated by, for example, the brake system and/or, if the vehicle is appropriately configured, the powertrain subsystem, a hill descent control (HDC) system, or another suitable component, etc.; or both. Accordingly, in an embodiment the adjustment in step 106 may comprise increasing or decreasing the rate at which a component of the net torque is adjusted, for example either one or both of a drive torque and a retarding torque applied to the wheels of vehicle 10 are increased or decreased. One way in which the torque rate(s) may be changed is by applying a gain to the commanded or applied torque which serves to thereby increase or decrease the rate of change of torque accordingly. This concept will be better understood in view of following illustrative scenarios.

Figure 7:
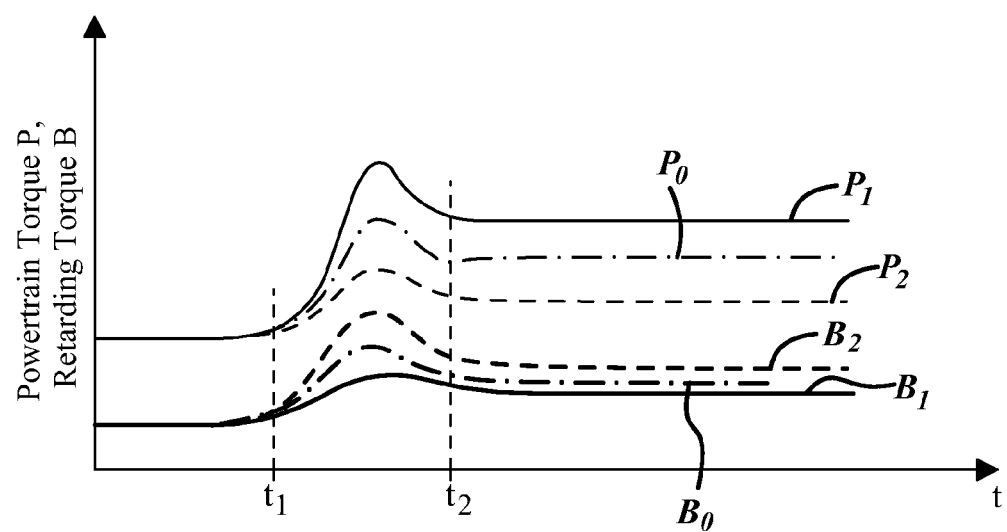
FIG. 7 is a graphical representation illustrating drive torque and retarding torque as a function of time during the operation of a vehicle wherein an external accelerating/decelerating force is acting on the vehicle as the set-speed thereof is being adjusted.

In a first scenario, assume that there is an external force acting on the vehicle having an accelerating effect thereon (i.e., an accelerating force resulting from, for example, the vehicle descending a gradient) and that the set-speed of the vehicle is being increased, in such an embodiment, because the force acting on the vehicle is an accelerating force, and because the vehicle needs to be accelerated to the new set-speed, less net torque increase is required than would be if the force acting on the vehicle was a decelerating force, and thus, the rate at which the powertrain subsystem increases the net torque applied to the vehicle wheels may be reduced in view of the accelerating tome acting on the vehicle (and as the force increases, the rate may be further reduced). Accordingly, a gain may be applied to the commanded or applied drive torque to reduce the rate at which the drive torque is increased, and a signal may be sent to the powertrain subsystem reflecting the same. In this instance, the applied gain will be less than that which would be applied if, for example and as will be described in the example below, the force acting on the vehicle was neutral, or for example was a decelerating force thereby necessitating a higher rate in torque increase to account for that decelerating force. In certain instances, in addition to or instead of decreasing the rate of the drive torque, the rate at which a retarding torque is decreased may also be reduced. With reference to FIG. 7, an example of this scenario will be provided. In FIG. 7, the trace $P_0$ reflects a commanded powertrain drive torque P as a function of time corresponding to an instance where the vehicle is traversing a flat surface without an out-of-the-ordinary external force acting thereon. The trace $P_2$ reflects a commanded powertrain drive torque P as a function of time while the vehicle is descending a gradient and an increase in set-speed is demanded at time $t=t_1$. A relatively small gain as compared to that which would be applied when the vehicle is traveling over level ground or ascending a gradient is applied to the demand for increased drive torque to accelerate the vehicle. At time $t=t_2$, the amount of drive torque is reduced to a value sufficient to sustain motion at the new target set-speed. If the gradient is sufficiently steep, an increase drive torque may not be required at all, but rather a decrease in retarding torque may be sufficient to accelerate the vehicle to the new target set-speed. In this way, the terrain may be taken advantage off in order to quickly respond to the user's demand while progressing in a composed manner.

In another example, assume now that there is an external force acting on the vehicle having a decelerating effect thereon (i.e., a decelerating force resulting from, for example, the vehicle ascending a gradient or traversing a high-drag terrain) and that the set-speed of the vehicle is being increased. In such an embodiment, because the force acting on the vehicle is a decelerating force, and because the vehicle needs to be accelerated to the new set-speed, more drive torque is required than would be if the force acting on the vehicle was an accelerating force, and thus, the rate at which the powertrain subsystem increases drive torque to the vehicle wheels must be increased in view of the decelerating force acting on the vehicle (and as the force increases, the rate may be further increased). Accordingly, a gain may be applied to the commanded or applied drive torque to increase the rate at which the drive torque is increased, and a signal may be sent to the powertrain subsystem reflecting the same. In this instance, and conversely to the example above, the applied gain will be greater than that which would be applied if the force acting on the vehicle was neutral or, as described above, was an accelerating force thereby necessitating a lower rate in torque change to account for that accelerating force. In certain instances, in addition to, or instead of, increasing the rate of the drive torque, the rate at which a retarding torque is decreased or reduced may also be increased. With reference once again to FIG. 7, an example of this scenario will be provided. In FIG. 7, and as was described above, the trace $P_5$ reflects a commanded powertrain drive torque P as a function of time corresponding to an instance where the vehicle is traversing a flat surface without an out-of-the-ordinary external force acting thereon. The trace $P_1$ reflects a commanded powertrain drive torque P as a function of time while the vehicle is ascending a gradient and an increase in set-speed is demanded at time $t=t_1$. A relatively high gain as compared to that which would be applied when the vehicle is traveling over level ground or ascending a gradient is applied to the demand for increased drive torque to accelerate the vehicle. At time $t=t_2$, the amount of drive torque is reduced to a value sufficient to sustain motion at the new target set-speed.

In yet another example, assume again that there is an external force acting on the vehicle having a decelerating effect thereon, but now the set-speed of the vehicle is being decreased. In such an embodiment, because the force acting on the vehicle is a decelerating force, and because the vehicle needs to be decelerated to the new set-speed, less retarding or braking torque is repaired than would be if the force acting on the vehicle was an accelerating force, and thus, the rate at which the brake subsystem (and/or another subsystem that is capable of generating and applying retarding torque—e.g., powertrain subsystem) increases retarding torque to the vehicle wheels must be decreased in view of the decelerating force acting on the vehicle (and as the decelerating force increases, the rate may be further decreased). Accordingly, a gain may be applied to the commanded or applied retarding torque to decrease the rate at which the retarding torque is increased and a signal may be sent to the brake subsystem reflecting the same. In this instance, the applied gain will be less than that which would be applied if, for example, the force acting on the vehicle was neutral, or was an accelerating force thereby necessitating a higher rate in torque change to account for that accelerating force. In certain instances, in addition to or instead of decreasing the rate of the retarding torque, the rate at which a drive torque is decreased may also be reduced so as to prevent the vehicle from rolling backwards down the gradient. With reference to FIG. 7, an example of this scenario will be provided. In FIG. 7, the trace $B_0$ reflects a commanded retarding or brake torque B as a function of time corresponding to an instance where the vehicle is traversing a flat surface without an out-of-the-ordinary external force acting thereon. The trace $B_1$ corresponds to retarding or brake torque B as a function of time while the vehicle is ascending a gradient and a decrease in set-speed is commanded. A relatively low gain is applied to the demand for increased retarding torque to decelerate the vehicle.

Finally, in yet another example, assume now that there is an external force acting on the vehicle having an accelerating effect thereon, and that that the set-speed of the vehicle is being decreased. In such an embodiment, because the force acting on the vehicle is an accelerating force, and because the vehicle needs to be decelerated to the new set-speed, mom retarding or braking torque is required than would be if the force acting on the vehicle was a decelerating tome, and thus, the rate at which the brake subsystem (and/or another subsystem that is capable of generating and applying retarding torque) increases retarding torque to the vehicle wheels must be increased in view of the accelerating force acting on the vehicle (and as the force increases, the rate may be further increased). Accordingly, a gain may be applied to the commanded or applied retarding torque to increase the rate at which the torque is increased, and a signal may be sent to the brake subsystem reflecting the same. In this instance, the applied gain will be more than that which would be applied if the force acting on the vehicle was neutral, or, as described above, was a decelerating force thereby necessitating a lower rate in torque change to account for that accelerating force. In certain instances, in addition to or instead of increasing the rate of the retarding torque, the rate at which a drive torque is decreased may also be increased. With reference once again to FIG. 7, an example of this scenario will be provided. In FIG. 7, and as described above, the trace $B_0$ reflects a commanded retarding or brake torque B as a function of time corresponding to an instance where the vehicle is traversing a flat surface without an out-of-the-ordinary external force acting thereon. The trace $B_2$ corresponds to retarding or brake torque as a function of time while the vehicle is descending a gradient and a decrease in set-speed is commanded. A relatively high gain is applied to the demand for increased retarding torque as compared to trace $B_1$ to decelerate the vehicle.

In an embodiment wherein a gain is applied to a component of the applied or commanded torque—be it drive torque, retarding torque, or both—the particular gain (e.g., magnitude) applied may be selected or chosen in a number of ways. In an embodiment, the gain may be selected from a plurality of predefined gains stored in a memory device of, or accessible by, the speed control system (e.g., memory 22 of VCU 16). These gains may be empirically derived and programmed into the memory device during the design, manufacture, and/or installation of vehicle 10 or a particular component thereof. In an embodiment, the particular gain that is selected or chosen to be applied may be dependent on the magnitude of the external force acting on the vehicle. Accordingly, in an embodiment wherein the external force is detected when the longitudinal acceleration of the vehicle diverges from a predetermined or prescribed acceleration profile, and the magnitude of that divergence or can be correlated with the magnitude of the external force, the particular gain to be applied may be selected based on the magnitude of the divergence from the acceleration profile. Accordingly, in an embodiment, the gain to be applied to a particular component of the commanded torque may be determined using the magnitude of the divergence and a data structure, such as, for example, a look-up table, that correlates the external force or acceleration profile divergence with gain. It will be appreciated that in other embodiments, different techniques for determining the particular gain to be applied may be used (e.g., the gain may be incrementally increased/decreased until the acceleration/deceleration of the vehicle is more in-line with an expected acceleration/deceleration, or gain may be determined based on sensed vehicle data, e.g., rolling resistance, vehicle attitude data including pitch, yaw, and mil, etc.), and such different techniques remain within the scope of this invention.

In certain instances or scenarios where vehicle 10 is ascending a gradient and, for example, the user brings the vehicle to a slop or near stand-still while the speed control system is active, the speed control system may be configured to prevent the vehicle from rolling down the gradient in a direction opposite the intended direction of travel. More specifically, the speed control system may be configured to command the application of retarding torque from, for example, the brake subsystem or powertrain subsystem (if suitably configured to do so), and balance the effect of the retarding torque with an appropriate level of drive or engine torque. The speed control system may be further configured to activate, or cause to be activated, a hill hold assistance system of the vehicle, for example, to provide additional support. As is known in the art, a hill hold assistance system is an automated braking feature arranged to release the brakes of the vehicle during a hill-start only when there is sufficient torque available from the powertrain subsystem to prevent unwanted movement of the vehicle. In other words, the hill hold assistance system is operative to hold the vehicle stationary until sufficient torque has been generated to prevent unintentional backward movement of the vehicle down the hill or gradient or to resume motion of the vehicle up the gradient. Accordingly, rather than the speed control system automatically deactivating when the vehicle is manually brought to a stop, it actively provides assistance to prevent unwanted and unintentional movement of the vehicle down the gradient.

Similarly, in certain instances where the user commands a reduction in the set-speed while ascending a gradient, the speed control system may be configured to determine that the rate of fall of vehicle speed (or deceleration) is such that the vehicle may eventually have insufficient net torque to maintain progress up the gradient and as such, could potentially and unintentionally reverse direction and roll down the gradient. For example, if the deceleration of the vehicle diverges from a prescribed acceleration/deceleration profile and/or corridor, or does so by at least a certain threshold amount, a determination may be made that there may be insufficient torque to maintain progress. If such a determination is made, the speed control system may be operable to effect the application of retarding torque from, for example, the vehicle braking subsystem or another source of retarding torque (e.g., the powertrain subsystem (if appropriately configured), a hill hold assistance system, and the like) to hold vehicle 10 stationary in order to prevent reversal of direction. That is, the speed control system may command that a brake or retarding torque may be automatically applied. The speed control system may then control or command the powertrain subsystem to generate or develop a sufficient drive or engine torque required to accelerate vehicle 10 from rest to a new set-speed (e.g., a predefined minimum set-speed of the speed control system). While in the embodiment described above the speed control system acts to bring vehicle 10 to a stop and hold it stationary until a sufficient amount of drive torque can be generated, it will be appreciated that in other embodiments, the speed control system may net be required to hold vehicle 10 stationary in order to prevent reversal of direction of travel.

Accordingly, in an instance wherein a vehicle is ascending a gradient and a decrease or reduction in set-speed is commanded, if the speed control system determines that the requested reduction, in set-speed would result in a rate of change of at least one component of the net torque being applied to one or more wheels of the vehicle such that the net torque would be insufficient to maintain vehicle progress up the gradient, the speed control system may be configured to decrease the rate of change of that at least one component of the net torque, activate a hill hold assist or other like component of the vehicle as described above, or both, to prevent movement of the vehicle down the gradient.

With reference to FIGS. 8A-8F, in order to provide a better understanding of various aspects of the invention described above, a number of non-limiting examples or scenarios will now be described to illustrate the application of some or all of the above-described aspects.

Figure 8A:
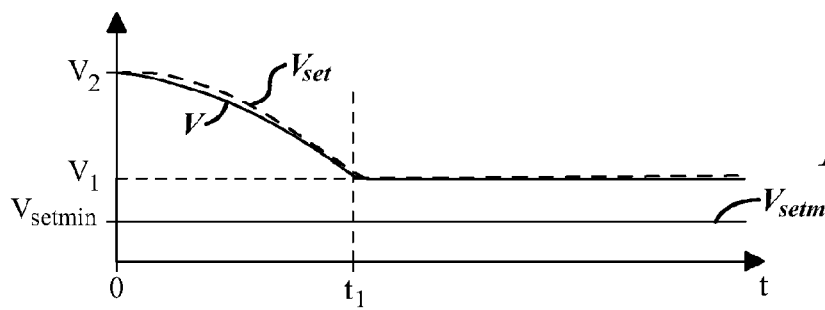
FIGS. 8A-8F are plots of certain vehicle parameters as a function of lime in different off-road driving situations illustrating operation of a speed control system according to an embodiment of the present invention.
Figure 8B:
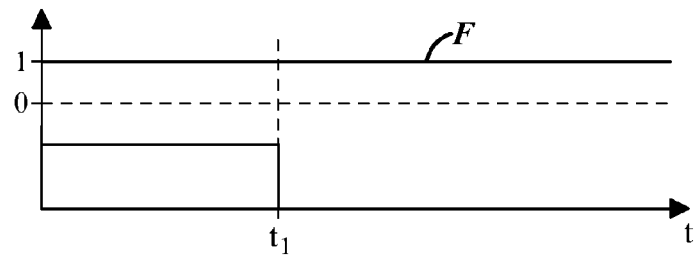

FIGS. 8A and 8B show schematically values of certain vehicle parameters as a function of time in an example scenario illustrating a manner of operation of the speed control system.

FIG. 8A shows a plot of vehicle speed (v) as a function of time whilst the vehicle 10 is ascending a relatively steep gradient, for example when at location B of FIG. 6. At time t=0 the vehicle 10 is travelling at a speed $v_2$. Also at time t=0 the user holds the brake pedal depressed by an amount d that is an appropriate amount to cause the set-speed $v_{set}$ of the speed control system to be reduced over the period from t=0 to t=$t_1$. In response to the reduction in $v_{set}$, the speed control system controls the powertrain drive torque and, if necessary brake or retarding torque, in order to reduce vehicle speed v towards the new set speed $v_{set}$. Thus, as $v_{set}$ decreases a corresponding decrease in speed v takes place, as shown in FIG. 8A. The speed control system controls, for example, the powertrain and braking subsystems to achieve a rate of deceleration that is within a prescribed acceleration corridor, which, for purposes of this example, corresponds to the range+/−(0.1 g-0.2 g).

The speed control system remains active throughout this period, with the speed control system status flag F set to F=1 as shown in FIG. 8B.

Figure 8C:
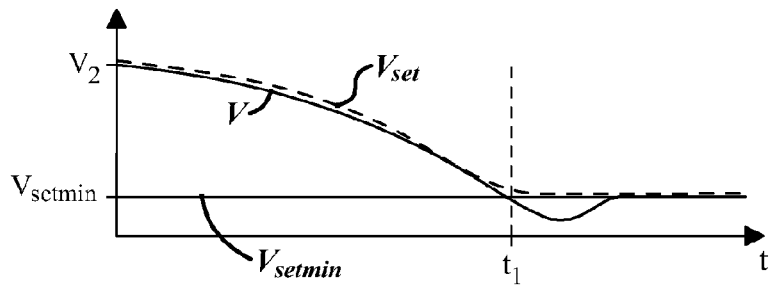
Figure 8D:
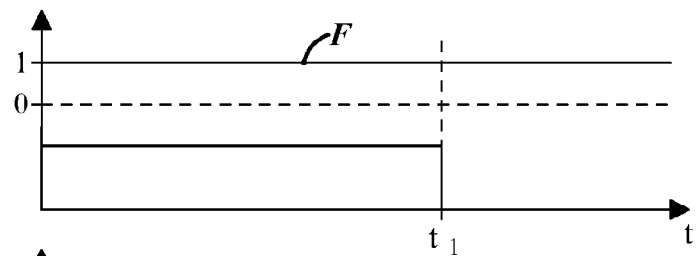

FIGS. 8C and 8D show schematically values of the vehicle parameters represented in FIGS. 8A and 8B in an alternative example scenario.

More particularly, FIG. 8C shows a plot of vehicle speed (v) as a function of time whilst ascending a similar relatively steep gradient. At time t=0 the vehicle is travelling at a speed $v_2$. Also at time t=0 the user holds the brake pedal depressed by an appropriate amount such that the set-speed of the speed control system $v_{set}$ reduces over the period from t=0 to t=$t_1$. At time $t_1$, when the set-speed reaches a value $v_{setmin}$, the driver releases the brake pedal. It is to be understood that $v_{setmin}$ corresponds to the lowest or slowest allowable vehicle set speed. In some embodiments the minimum allowable set speed may be a speed of around 1-3 mph (approximately 1-5 kph) or another suitable value.

In response to the reduction in $v_{set}$, the speed control system controls the powertrain drive torque and if necessary brake or retarding torque in order to reduce the vehicle speed towards the new set speed $v_{setmin}$. The speed control system controls the powertrain and brake subsystems to achieve a rate of deceleration that is within the prescribed acceleration corridor of +/−(0.1 g-0.2 g).

In the example illustrated, the speed control system determines that it does not need to apply the brake subsystem in order to reduce vehicle speed v at a rate within the prescribed corridor. However in the example shown, the vehicle speed v falls below the new set speed $v_{setmin}$ (an undershoot condition), due to the steepness of the gradient. Although the speed falls below $v_{setmin}$ the speed control system controls the speed to rise back to $v_{setmin}$ and the vehicle continues to progress at new set speed $v_{setmin}$. As can be seen from FIG. 8D, the speed control system status flag F remains set to F=1 throughout the set speed reduction operation. In other words, the speed control system does not cancel automatically control of vehicle progress even though vehicle speed v falls below $v_{setmin}$ because the set-speed of the speed control system never fell below $v_{setmin}$.

In some scenarios, and as described above, it is possible that the speed control system may determine that the rate of fall of speed v for deceleration) is such that the vehicle may eventually have insufficient torque to maintain progress up the slope. If such a determination is made, the speed control system is operable to apply the vehicle foundation braking system to hold the vehicle stationary in order to prevent reversal of direction. That is, brake or retarding torque is applied automatically. The speed control system may then control the powertrain subsystem to develop sufficient torque to accelerate the vehicle from rest to new set speed $v_{set}$.

Figure 8E:
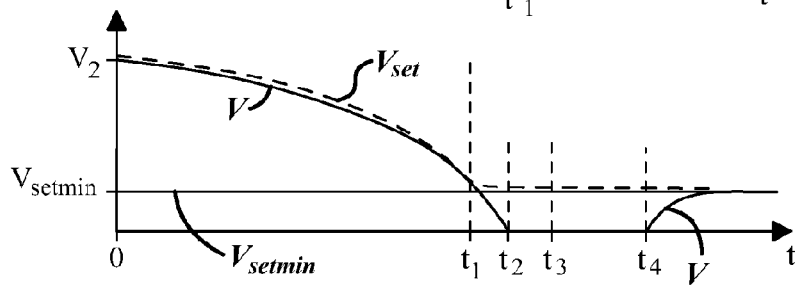
Figure 8F:
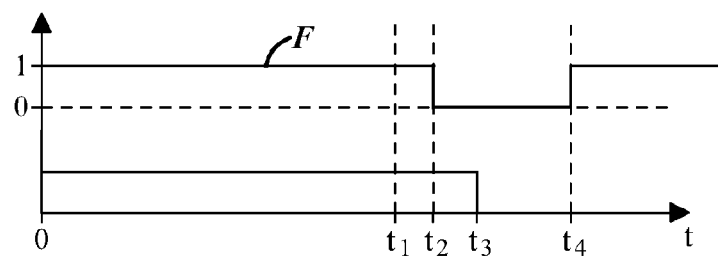

FIGS. 8E and 8F show schematically values of the vehicle parameters represented in FIG. 8A-8D in a further alternative example scenario, to further illustrate operation of the speed control system.

The scenario is similar to that shown in FIGS. 8C and 8D except that the user releases the brake pedal only after the set speed $v_{set}$ has fallen below the minimum speed $v_{setmin}$, such as in this example, when vehicle speed has fallen to zero in the example shown.

FIG. 8E is a plot of vehicle speed v as a function of time whilst ascending a similar, relatively steep gradient to location B of FIG. 6. At time t=0 the vehicle is travelling at a speed $v_2$. Also at time t=0 the user holds the brake pedal depressed by an amount corresponding to a relatively light pressure such that the vehicle set speed $v_{set}$ reduces over the period from t=0 to t=$t_1$ from $v_2$ to $v_{setmin}$. At time $t_1$, when set speed reaches $v_{setmin}$, the user maintains the light pressure on the brake pedal. In the present example, the amount of pressure is sufficient to cause application of the braking system, albeit relatively lightly, such that the braking system is applying brake or retarding torque to the wheels. Once the vehicle speed v falls to zero, or a prescribed value below $v_{setmin}$, the speed control system recognises that the user apparently wishes to override control of the vehicle by the speed control system and therefore cancels or suspends vehicle control at time $t_2$. Speed control system status flag F is therefore changed from F=1 to F=0.

At time the user releases the brake pedal. If deemed necessary a hill hold assistance system or like may maintain a braking system active so as to prevent movement of the vehicle in a reverse direction if a risk of such exists. At time $t_4$ the user selects operation of the speed control system by manipulating an appropriate user interface device (e.g., user interface devices 44). Alternatively, the speed control system may resume control of the vehicle speed when the user lifts his foot off the brake pedal and manipulates a predetermined user interface device. Responsive to the user's input, the speed control system controls the vehicle to accelerate from rest to the minimum set speed $v_{setmin}$, and in other embodiments, the speed control system may permit the user to select a previously used user-defined set speed held in a memory. The speed control system again controls the rate of acceleration such that where possible it falls within the prescribed acceleration corridor.

In an embodiment, the functionality of step 106 may be performed by VCU 16, and, for example, as part of the operation of a PID controller embodied in software therein, in particular; while in other embodiments. It may be performed by another suitable component of vehicle 10. Accordingly, the present invention is not limited to the performance of step 106 by any one particular component or device of vehicle 10.

In an instance where an adjustment is made to an aspect of the applied torque in step 106, in one embodiment, method 100 ends following that adjustment and is repeated when, for example, another change in the target set-speed is commanded in step 102; in another embodiment, however, method 100 is iterative. In an embodiment wherein method 100 is iterative, following step 108 method 100 loops back to step 104 and the methodology is repeated as described above. Such an iterative or continuous process allows for precise control over the speed adjustment of the vehicle such that it is more in-line with a predetermined or prescribed acceleration profile and/or a predetermined acceleration corridor (e.g., +/−(0.1 g-0.2 g)) and more as the user would expect it to be. In this way, the adjustment to be made to the rate of change of torque is applied directly upon command of a torque change as the external forces acting on the vehicle are already known.

It will be appreciated in view of the above that a benefit of the present system and method, among others, is that external forces acting on the vehicle that cause the vehicle to either accelerate or decelerate during, for example, a change in vehicle speed from a first set-speed to a target set-speed may foe detected and compensated for. As a result, the acceleration or deceleration of the vehicle, or the maintenance of a vehicle at a set-speed despite external forces, as the case may be, will be more precisely controlled to avoid or at least minimise set-speed overshoot or undershoot. This acceleration or deceleration may also be more in-line with a predetermined or prescribed acceleration profile and/or acceleration corridor, may maintain or improve vehicle composure, and/or may be more as the user of the vehicle would expect it to be.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method of operating a speed control system of a vehicle, comprising:
   detecting an external force acting on the vehicle wherein the external force has a accelerating or decelerating effect on the vehicle;
   automatically adjusting a rate of change of at least one component of a net torque being applied to one or more wheels of the vehicle to compensate for the accelerating or decelerating effect of the external force on the vehicle, wherein
   the adjusting step comprises applying a predetermined gain to at least one component of the net torque being applied to one or more wheels of the vehicle, thereby increasing or decreasing the rate at which the at least one component of the net torque is changed,
   the method further comprising receiving a command to change a set-speed of the speed control system from a first set-speed to a target set-speed that is lower than the first set-speed, the adjusting step comprising adjusting the rate of change of said at least one component of the net torque to decelerate the vehicle to the target set-speed,
   wherein, where the external force has a decelerating effect as a result of the vehicle ascending a gradient, and if the received command to change the set-speed would result in a rate of change of at least one component of the net torque being applied such that the net torque would be insufficient to maintain vehicle progress up the gradient, the method further comprises decreasing the rate of change of at least one component of the net torque being applied to prevent movement of the vehicle down the gradient.

2. The method of claim 1, further comprising activating a hill hold assistance system of the vehicle configured to maintain the vehicle stationary on the gradient until sufficient net torque has been generated to prevent movement down the gradient or to resume motion of the vehicle up the gradient.

3. The method of claim 1, wherein the adjusting step comprises adjusting the rate of change of at least one component of the net torque being applied to accelerate or decelerate the vehicle to the target set-speed in accordance with a predetermined acceleration profile, and wherein said acceleration profile comprises an acceleration corridor comprising a range between a desired acceleration and a maximum desired acceleration.

4. The method of claim 1, wherein the detecting step comprises one of:
   comparing the longitudinal acceleration of the vehicle to a predetermined acceleration profile and detecting that an external force is acting on the vehicle when the longitudinal acceleration of the vehicle diverges from the predetermined acceleration profile;
   evaluating one or more operational parameters of the vehicle, and detecting that an external force is acting on the vehicle based on that evaluation; and
   detecting that the vehicle is traversing a terrain that will cause an external force to be applied to the vehicle.

5. The method of claim 1, wherein the adjustment to the rate of change of at least one component of the net torque being applied is dependent upon the magnitude of the force acting on the vehicle.

6. The method of claim 1, wherein the component of the net torque comprises one or more of a retarding torque and a drive torque being applied to one or more wheels.

7. The method of claim 6, wherein the adjusting step further comprises adjusting the rate at which one or both of the retarding torque and drive torque applied to one or more wheels of the vehicle is reduced or increased.

8. A system for controlling the speed of a vehicle, comprising:
   an electronic control unit (ECU), the ECU configured to:
      detect an external force acting on the vehicle wherein the external force has an accelerating or decelerating effect on the vehicle; and
      automatically adjust a rate of change of at least one component of a net torque being applied to one or more wheels of the vehicle to compensate for the accelerating or decelerating effect of the external force on the vehicle;
      wherein the ECU is configured to adjust the rate of change of at least one component of the net torque being applied by applying a predetermined gain to at least one component of the net torque being applied, thereby increasing or decreasing the rate at which the at least one component of the net torque is changed,
      the ECU being further configured to receive a command to change a set-speed of the system from a first set-speed to a target set-speed that is lower than the first set-speed, and wherein the ECU is configured to adjust the rate of change of at least one component of the net torque being applied to one or more wheels of the vehicle by adjusting the rate of change of said at least one component of the net torque to decelerate the vehicle to the target set-speed,
      wherein when the external force has a decelerating effect on the vehicle as a result of the vehicle ascending a gradient, the ECU is configured to determine if the received command to change the set-speed would result in a rate of change of at least one component of the net torque being such that the net torque would be insufficient to maintain vehicle progress up the gradient, and in response thereto the ECU is further configured to decrease the rate of change of at least one component of the net torque to prevent movement down the gradient.

9. The system of claim 8, wherein the ECU is further configured to activate a hill hold assistance system of the vehicle to maintain the vehicle stationary on the gradient until sufficient net torque has been generated to prevent movement down the gradient or to resume motion of the vehicle up the gradient.

10. The system of claim 8, wherein the ECU is configured to detect the external force acting on the vehicle in response to receiving the command to change the set-speed of the system.

11. The system of claim 8, wherein the ECU is configured to adjust the rate of change of at least one component of the net torque being applied to one or more wheels of the vehicle in accordance with a predetermined acceleration profile, and wherein said acceleration profile comprises an acceleration corridor comprising a range between a desired acceleration and a maximum desired acceleration.

12. The system of claim 8, wherein the ECU is configured to detect the external force acting on the vehicle by:
    comparing the longitudinal acceleration of the vehicle to a predetermined acceleration profile and detecting that an external force is acting on the vehicle when the longitudinal acceleration of the vehicle diverges from the predetermined acceleration profile; or
    evaluating one or more operational parameters of the vehicle, and detecting that an external force is acting on the vehicle based on that evaluation; or
    detecting that the vehicle is traversing a terrain that will cause an external force to be applied to the vehicle.

13. The system of claim 8, wherein the ECU is configured to adjust the rate of change of at least one component of the net torque being applied depending upon the magnitude of the force acting on the vehicle.

14. The system of claim 8, wherein the component of the net torque comprises one or more of a retarding torque and a drive torque being applied to one or more wheels, and wherein the ECU is configured to adjust the rate of change of at least one component of the net torque being applied by adjusting the rate at which one or both of the retarding torque and drive torque applied to one or more wheels is reduced or increased.

15. A vehicle comprising the system as recited in claim 8.

16. A carrier medium carrying a computer-readable code for controlling a vehicle to carry out the method according claim 1.

17. The method of claim 1, wherein the detecting step comprises comparing the longitudinal acceleration of the vehicle to a predetermined acceleration profile and detecting that an external force is acting on the vehicle when the longitudinal acceleration of the vehicle diverges from the predetermined acceleration profile, the method further comprising:
    selecting the predetermined gain to be applied from a plurality of predefined gains and based on the magnitude of the divergence between the longitudinal acceleration of the vehicle and the predetermined acceleration profile.

* * * * *